United States Patent
Kemp et al.

(10) Patent No.: US 6,862,497 B2
(45) Date of Patent: Mar. 1, 2005

(54) MAN-MACHINE INTERFACE UNIT CONTROL METHOD, ROBOT APPARATUS, AND ITS ACTION CONTROL METHOD

(75) Inventors: Thomas Kemp, Remseck (DE); Ralf Kompe, Fellbach (DE); Raquel Tato, Stuttgart (DE); Masahiro Fujita, Tokyo (JP); Katsuki Minamino, Tokyo (JP); Kenta Kawamoto, Tokyo (JP); Rika Horinaka, Tokyo (JP)

(73) Assignees: Sony Corporation, Tokyo (JP); Sony International (Europe) GmbH, Berlin (DE)

( * ) Notice: Subject to any disclaimer, the term of this patent is extended or adjusted under 35 U.S.C. 154(b) by 60 days.

(21) Appl. No.: 10/343,525

(22) PCT Filed: Jun. 3, 2002

(86) PCT No.: PCT/JP02/05441

§ 371 (c)(1),
(2), (4) Date: Jun. 16, 2003

(87) PCT Pub. No.: WO02/099545

PCT Pub. Date: Dec. 12, 2002

(65) Prior Publication Data

US 2004/0039483 A1 Feb. 26, 2004

(30) Foreign Application Priority Data

Jun. 1, 2001 (EP) .............................................. 01113422

(51) Int. Cl.[7] .......................... G05B 15/00; G05B 19/33
(52) U.S. Cl. ........................... 700/264; 700/17; 700/83; 700/86; 700/245; 700/257; 700/258; 700/259; 341/20; 341/21; 341/22; 341/173; 341/176; 342/45; 342/473
(58) Field of Search .............................. 700/17, 83, 86, 700/245–246, 257–259; 341/20–22, 173, 176; 342/45, 473; 345/157–158, 837, 957; 318/563

(56) References Cited

U.S. PATENT DOCUMENTS

| | | | | |
|---|---|---|---|---|
| 5,228,854 A | * | 7/1993 | Eldridge | 434/11 |
| 5,378,155 A | * | 1/1995 | Eldridge | 434/11 |
| 6,189,317 B1 | * | 2/2001 | Yasui et al. | 60/284 |
| 6,199,030 B1 | * | 3/2001 | Stone | 703/8 |
| 6,763,325 B1 | * | 7/2004 | Stone | 703/8 |
| 6,778,867 B1 | * | 8/2004 | Ziegler et al. | 700/79 |

FOREIGN PATENT DOCUMENTS

| | | |
|---|---|---|
| JP | 5-162569 | 6/1993 |
| JP | 11-259129 | 9/1999 |
| JP | 2000-38658 | 2/2001 |
| JP | 2001-100888 | 4/2001 |

OTHER PUBLICATIONS

Palm et al., "Status driven teleoperation system: a new paradigm and an application to the microworld", EEE, vol.:3, Nov. 4–8, 1996 Page(s): 1187–1194 vol. 3.*

* cited by examiner

*Primary Examiner*—Gary Chin
*Assistant Examiner*—McDieunel Marc
(74) *Attorney, Agent, or Firm*—Frommer Lawrence & Haug LLP; William S. Frommer

(57) ABSTRACT

There is proposed a method that may be universally used for controlling a man-machine interface unit. A learning sample is used in order at least to derive and/or initialize a target action (t) to be carried out and to lead the user from an optional current status ($e_c$) to an optional desired target status ($e_t$) as the final status ($e_f$). This learning sample (l) is formed by a data triple made up by an initial status ($e_i$) before an optional action (a) carried out by the user, a final status ($e_f$) after the action taken place (a).

36 Claims, 18 Drawing Sheets

| node 100 | input event name | data name | data extent | transition probability to other node Di | | | | |
|---|---|---|---|---|---|---|---|---|
| | | | | A | B | C | D | n |
| transition destination node | | | | node 120 | node 120 | node 1000 | | node 600 |
| output action | | | | ACTION 1 | ACTION 2 | MOVE BACK | | ACTION 4 |
| 1 | BALL | SIZE | 0.1000 | 30% | | | | |
| 2 | PAT | | | | 40% | | | |
| 3 | HIT | | | | 20% | | | |
| 4 | MOTION | | | | | | | |
| 5 | OBSTACLE | DISTANCE | 0.100 | | | 50% | | |
| 6 | | JOY | 50.100 | | | 100% | | |
| 7 | | SURPRISE | 50.100 | | | | | |
| 8 | | SADNESS | 50.100 | | | | | |

| AU number | descriptor | base muscle |
|---|---|---|
| 1. | lift inner side of brow | Frontalis,Pars Medialis |
| 2. | lift outer side of brow | Frontalis,Pars Lateralis |
| 4. | lower brow | Depressor Glabellae,Depressor Supercilli,Corrugator |
| 5. | lift upper eye winker | Levator Palpebrae Superioris |
| 6. | lift cheek | Orbicuiaris Oculi,Pars Orbitalis |
| 7. | close eye winker strongly | Orbicuiaris Oculi,Pars Palebralis |
| 9. | wrinkle nose | Levator Labii Superioris,Alaeque Nasi |
| 10. | lift upper lip | Levator Labii Superioris,Caput Infraorbitalis |
| 11. | deepen nostrils | Zygomatic Minor |
| 12. | tug up end of lip | Zygomatic Major |
| 13. | expand cheek | Caninus |
| 14. | make dimple | Buccinator |
| 15. | lower lip end | Triangularis |
| 16. | lower lower lip | Depressor Labii |
| 17. | raise lower jaw | Mentalis |
| 18. | contract lip | Incisivii Labii Superioris;Incisivii Labii Inferioris |
| 20. | expand lip | Risorius |
| 22. | funnel lip | Orbicularis Oris |
| 23. | close lip strongly | Orbicularis Oris |
| 24. | tighten lip | Orbicularis Oris |
| 25. | open lip | Depressor Labii,or Relaxation of Labii Inferioris |
| 26. | lower jaw | Masetter;Temporal and Internal Pterygoid Relaxed |
| 27. | expand mouth | Pterygoids;Digastric |
| 28. | suck lip | Orbicularis Oris |

FIG.13

MAN-MACHINE INTERFACE UNIT CONTROL METHOD, ROBOT APPARATUS, AND ITS ACTION CONTROL METHOD

TECHNICAL FIELD

This invention relates to a method for controlling a man-machine interfacing unit, a robot apparatus, and to a method for controlling the behavior. More particularly, it relates to a method for controlling a man-machine interfacing unit having a step of learning the performance and/or the entertainment capability, a robot apparatus to which the man-machine interfacing unit controlling method is applied, and to a method for controlling the behavior.

BACKGROUND ART

Nowadays, a large variety of equipment and appliances employ man-machine-interface techniques, man-machine-dialogue systems, and/or the like to ensure an easy and reliable use of the equipment and to increase the user's convenience.

Prior art method and systems for controlling man-machine-interface units involved in such equipment and appliances use predetermined rules which are derived from common knowledge and/or from user studies to generate appropriate actions and behavior of a machine with respect to the behavior and the expectations of the user.

These given predetermined rules are essentially fixed and the performance capability of such a method and system for controlling a man-machine-interface unit is limited to a set of generic and/or user-independent rules and actions. Although this might be the best solution on average, it is in most cases, i.e. for most specific users, not an optimal solution.

DISCLOSURE OF THE INVENTION

It is an object of the present invention to provide a method for controlling a man-machine-interface unit with a flexible and reliable response to the behavior, expectations and inquiries of a human user.

The object is achieved by a method for controlling a man-machine-interface with the features of claim 1. Preferred embodiments of the inventive method for controlling a man-machine-interface unit are within the scope of the dependent sub-claims. Additionally, the object is achieved by a system for controlling a man-machine-interface according to the features of claim 19 and by a computer program product according to the features of claim 20.

In the inventive method for controlling a man-machine-interface unit with respect to at least one user an initial status before and a final status after an action taken place are detected. Further, data triples essentially representing the initial status, the final status, and the action taken place are collected as learning samples. The learning samples are used to at least derive and/or initialize a target action to be carried out so as to carry in each case the user from a given current status to a given desired target status.

It is therefore a basic idea of the present invention to derive for at least one user with respect to an action which is carried out—in particular by the man-machine-interface unit itself and/or by an execution unit connected thereto—an initial status of the user before the action has taken place and a final status immediately after the action has taken place or of data corresponding to or being representative for the initial status and/or the final status of the user. Then, learning samples are generated as data triples or triplets which essentially represent the initial status, the final status and the action which has been carried out between the initial status and the final status. Furtheron, the learning samples are collected and used to at least derive and/or initialize target actions to be carried out to transform a given user from a given current status to a given desired target status by means of the target action.

In contrast to prior art method for controlling a man-machine-interface unit the inventive method is particular flexible, as the method does not focus on a given, fixed and predetermined set of rules which are consequently user-independent. In contrast, the inventive method alternatively or additionally obtains data from the situation taking place and the interaction between the user and the man-machine-interface unit. Data are measured and obtained which correspond to the status of the user before and after a performed action. Therefore, the action carried out connects the initial status of the user before the action with the final status of the user after the action.

It is preferred for representing the different statuses in each case to receive and/or generate current or initial status data. These current or initial status data essentially correspond to and/or represent the current status and/or the initial status of the user, respectively.

Furtheron, in each case final or target status data are received and/or generated. These final or target status data essentially correspond to and/or represent the final status and the target status of the user, respectively.

Additionally, action data and target action data may be received and/or generated essentially corresponding to and/or representing the action taken place and the target action derived in accordance with a further preferred embodiment of the inventive method.

A natural and canonical description and representation of the different statuses and statuses is achieved in accordance with a preferred and advantageous embodiment of the present invention according to which the current, initial, final and/or target statuses and in particular the representing and/or corresponding data thereof are in each case represented by and/or modeled in an embedding topological manifold, in particular of two dimensions.

Alternatively or additionally the action taken place, the target action and/or the representing and/or corresponding data thereof may be in each case represented by and/or modeled in an embedding topological manifold.

Of course, the above-mentioned topological manifolds may be built up, derived and/or used as separate manifolds for each distinct user. Alternatively or additionally, a plurality of users may be subdivided into classes of equivalent users and for each of the classes may be built up, derived and/or used a separate manifold. Alternatively, common or global manifolds for all users may be derived and/or used. This may also be done as an additional measure.

Although several properties of the users may be involved to describe the different statuses, it is preferred in accordance with another advantageous embodiment of the present invention to use emotional statuses or the like as the current, initial, final, target statuses of the user.

Each action taken place or to be performed can be understood as an entity which connects at least one initial status with at least one final or target status of the user. Therefore, pairs of initial statuses and certain actions are connected in some sense with a final status. As all statuses and actions may be understood as topological manifolds a mapping—called transmotion mapping T—may be defined for each user based on the set of all learning samples. The transmotion mapping T may be given by the following equation (1):

$$T: E \oplus \times A \to E \quad \langle ei.a \rangle \in \oplus A \to ef := T(ei,a) = Ta(ei) \in E \quad (1)$$

wherein E denotes an emotion manifold and is one of the topological manifolds for the user statuses or for the status data thereof, A denotes an action manifold and is one of the topological manifolds for the actions or for the action data and ei, ef, a denote respective elements of the manifold E and A, respectively.

To each pair <e, a> of the Cartesian product E×A or the Tensor product E⊕A is assigned another element T(e, a) of the emotion manifold E. Therefore, by the transmotion mapping T and the action manifold A a family of mappings Ta from E into E is defined.

Of course, the transmotion mapping T is in general user-dependent but may contain user-independent and/or generic parts or components.

There are many different ways to choose a particular target action to transform a user from a current status to a desired final status. In accordance with a preferred embodiment of the inventive method for given desired initial and/or target statuses for a given user an action from a learning sample with given current status, final status and action taken place already sampled is chosen as a target action for which the initial and current statuses and/or the final and target statuses and/or the data thereof are in a next topological neighborhood.

This measure is of particular advantage in the case that at least one of the statuses and/or the action do not match exactly. Based on the notion of topological vicinity or neighborhood adjacent samples may be used as equivalent samples with respect to a given learning sample.

It is of particular advantage to use a distance measure, a metric, continuity, direction, vector properties, and/or the like of the statuses and/or actions with respect to each other to derive and/or describe the neighborhoods and/or vicinities.

In some cases it might be possible that desired initial or current statuses and final or target statuses of a given user cannot be transformed into each other or connected with another directly. It is therefore advantageous in accordance with a preferred embodiment of the inventive method to derive or initialize a sequence of actions to be executed as the target action so as to lead a given user to a target status to fit best to a given desired final status for the user. Thereby, a path through the emotion manifold E is characterized and defined by the sequence of actions.

In other cases using a given and known action—e.g. from a learning sample already obtained—as a target action might not be sufficient for obtaining a good result when trying to transform a user's initial status to a final status. Therefore, a modification may be included into and/or performed on a derived target action and/or the data thereof to achieve a good transformation result.

These modification may be introduced randomly by means of a probabilistic measure, on the basis of topological, distance, metric, continuity, direction, vector properties, and/or the like.

As learning samples can often be obtained only at a slow pace or low rate—perhaps with a few learning samples every day—it is of particular advantage to generalize the obtained learning samples in particular to derive the topological manifolds. Therefore, the obtained learning samples serve as reference points and/or measuring points in the topological manifold E and A and their generalizations serve as interpolations between the measuring points.

The step of generalization may comprise a step of averaging and/or weighting learning samples from different users, in particular to derive common and/or global topological manifolds. The different users may in particular be emotionally clustered depending on their typical status and/or behavior.

Additionally or alternatively, the step of generalizing the learning samples may at least comprise a step of reducing the dimensions of the action manifold A, in particular by means of a projection process, or the like. Thereby, the degrees of freedom are reduced and several classes of actions are identified and made equivalent with respect to each other.

Furtheron, the step of generalizing the learning samples may include a step of enlarging and/or reducing the extension of a neighborhood or vicinity of a given learning sample within which all triples or triplets of initial statuses, final statuses and target actions are classified as being equivalent to the given learning sample. This is in particular performed until the point where a target action and/or a final status are valid for all initial statuses. Additionally or alternatively, this measure is carried out until the point where the final status is irrelevant and only a direction of a change of the status is considered.

It is a further aspect of the present invention to provide a system, an apparatus, a device, and/or the like for controlling a man-machine-interface unit which is in each case capable of performing and/or realizing the inventive method for controlling a man-machine-interface unit and/or of its steps.

Additionally, it is a further aspect of the present invention to provide a computer program product comprising computer program means which is adapted to perform and/or realize the inventive method for controlling a man-machine-interface unit or of its steps when it is executed on a computer, a digital processing means, and/or the like.

The above-mentioned and further aspects of the present invention will become more elucidated taking into account the following remarks:

The performance of a man-machine-interface and/or the goal of entertaining and responding a user may be achieved by an artificial system like an entertainment robot, or the like. In particular, this goal can be achieved by estimating a topological map or manifold of user emotions or emotion changes. In a particular simple example this topological map or manifold may be built up by a 2-dimensional emotional plane. The topological map or manifold is defined over the multidimensional space of possible or potential system actions. Given such a map or manifold the system or method can lead the user to any desired emotion starting at any given initial emotion. The map function may be initialized with some heuristic relationships or with any prior art known up to now. While the method and system is being used it automatically improves its performance by measuring the users emotions. Thereby, the method and system improves the granularity of the map and/or creates user-dependent maps or manifolds.

Man-machine-interface units or devices and in particular entertainment robots known in the art use predetermined rules which are derived from user studies and/or common knowledge. These predetermined rules are fixed and they are used to decide on the type of action to take giving the goal—for instance to entertain—and potentially the current emotion of the user. However, the predetermined and fixed rules are static and they are not user-dependent. Some of the proposed prior art methods to facilitate this decision process can possibly incorporate learning of user-dependent strategies to entertain the user and to behave in an appropriate way. However, no good algorithm has yet been proposed that can generalize single observations arbitrarily, thereby enabling the system to incrementally improve the performance both of the user-independent and the user-dependent mode.

The variety of human statuses and in particular of human emotions can be spread out as a topological manifold and in particular as a 2-dimensional map. In that 2-dimensional map the two axes denote pleasure and arousal. In such a plane the top right area describes moods like delighted, blissful, excited, or the like statuses. The top left area describes for example terrified, angry, disgusted statuses. The lower right area contains for example content and relaxed mood, while the lower left area describes sadness, depression, boredom, and the like.

Emotions that are close to each other on this manifold or plane are similar emotions. It is easier to change the mood from a point on the emotional manifold or plane to another point that is close than to change to a point in the far distance. This topological property of the emotional manifold or plane is the basis for the invention.

The appropriate action in the task of behaving in appropriate manner or entertaining a user are highly dependent on the current mood and status of the user and on the desired status or mood change and additionally on the identity of the user. However, in a man-machine-interface unit and in particular in an entertainment robot product which is to be sold in quantities, the identity of the user is not known beforehand. Hence, the entertainment ability of the system must be limited to a set of generic, user-independent actions. While this is the best solution on average, it is a sub-optimal solution for nearly every specific user. Therefore, the performance and entertainment ability should be learned by each unit of an entertainment robot or man-machine-interface unit independently, using its respective owner as an optimization target.

If the system can detect the emotion of its user before and after any action has been performed by the system, such a measurement can serve as a learning sample from which future decisions in similar situations can be derived. However, the learning samples come at a slow pace or low rate of only a few of them every day. There is so far no method known in the art how an entertainment robot or a man-machine-interface unit can profit from every single learning sample if learning samples are fed in incrementally with a priori unknown frequency.

Given a set of samples or learning samples where each sample consists of (a) an initial point on the emotional manifold or plane indicating the initial user emotion (b) some multidimensional vector describing the action of the device—for example describing the performance of an entertainment robot or a dialogue strategy of a chatter box—and (c) a final point on the emotional manifold or plane, indicating the final user emotion after the action of the device has been perceived. Then, each such learning sample can be put onto the map or manifold and can be described as a vector starting at the initial point of the emotional manifold or plane, pointing to the final point and having an attribute of the multidimensional action vector of the action manifold described under (b) above. Each sample can be put into the plane independently from each other sample. Every user has in general its own emotional map or manifold where only his learning samples are added, described and/or generalized.

If such an emotion manifold or map exists or is derived for a given user it is easy and straightforward to find an appropriate action if any initial status or mood and any desired target status or mood of the user are given. This is achieved by selecting an appropriate action vector starting at least in a neighborhood or vicinity of the point corresponding to the initial status or mood and pointing into the right and correct direction into a vicinity or neighborhood of a point corresponding to the given target mood or status within the emotion manifold or map of the respective user. Then, the action described by the distinct action vector is carried out and performed so as to transform the user's initial status to the target or final status. It is beneficial and improves the generalization performance if not an old and given action is repeated but if the old action is slightly and/or randomly modified. This measure is equivalent to repeating successful strategies in an evolutionary way that makes room for further improvements of the strategy.

Since the emotional map will usually be sparsely filled with learning samples or sample vectors generalizing the set of sample vectors is extremely important for the performance level of the method and the algorithm. This is in particular true since learning samples come in only quite slowly and with a low rate—typically only a few of them every day—but the method and the system need to learn starting from the very first learning sample and also may take into account a set of generic and user-independent starting rules.

This generalization can be accomplished using several techniques. First of all, emotion manifolds or maps of users can simply be averaged by adding learning samples of sample vector of different users into one user-independent sample. Additionally, global or common emotion manifolds or maps for classes of users or for all users may be derived.

Second, projections of the multidimensional action vectors or action data to reduce the action dimensions can be computed, which reduces the dimensionality of the action manifold or space.

Third, the area in which sample vector or learning sample is considered to be valid for a given starting emotion can be made larger up to the point where a single example is to be considered to be typical for all initial emotions.

Fourth, the target area can be made larger in a similar way up to the point where the target area is regarded as being irrelevant completely and only the direction of the emotional change vector is considered.

This generalizations can be used independently from each other. Alternatively, they can be combined. Particularly, if only few learning samples are available, the system can always find a suitable action by increasing the degree of generalization until a sample action can be found. Thereby, the system will profit even from one single observations or learning sample and every additional learning sample will increase the system performance in a very natural and incremental way by allowing it to deduce next actions by generalizing—relaxing constraints—less and less as the emotional map is filled more and more with useful learning samples.

The new method and algorithm provides incremental improvement of the system performance, starting with the very first sample observation, while still allowing a very fine model of emotional changes. The same algorithm can be used for both cores and fine models.

The above-mentioned and further features and advantages of the invention will become more apparent from the following description taking into account the accompanying figures.

BRIEF DESCRIPTION OF THE DRAWINGS

FIG. 10 shows a status transition table provided for each node of the finite probability automaton.

FIG. 13 illustrates an actuation unit (AU) used for recognition of expressions of the user's face.

BEST MODE FOR CARRYING OUT THE INVENTION

Figure 1:
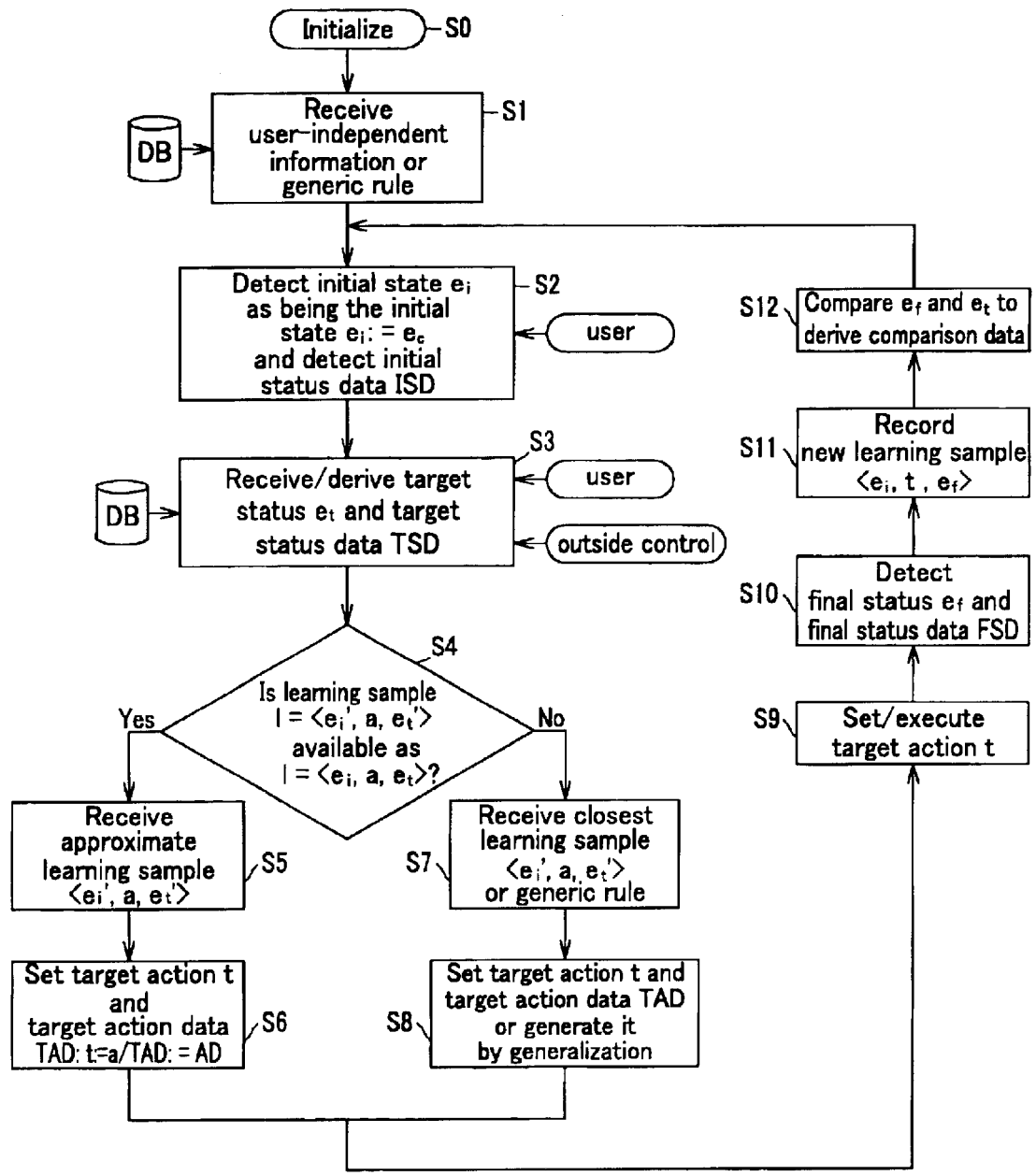
FIG. 1 is a schematic block diagram showing a preferred embodiment of the inventive method for controlling a man-machine-interface unit.

Referring to the drawings, specified embodiments of the present invention are explained in detail. The following embodiment is directed to a method and a system for controlling a man-machine interface unit in association with the user's operations, expectations or emotion, as a basic principle of the present invention, and to a specified example of application of the present method and system to an autonomous type entertainment robot having at least the emotion model and which is able to change the behavior it expresses responsive to the emotion.

(1) Method for Controlling the Man-Machine Interface Unit

Preferred embodiments of the method and the system of the present invention for controlling the man-machine interface unit are shown in the flowchart of FIG. 1, in which the embodiments are illustrated by steps from S0 to S12.

In a first step S0, the method and the system are initialized with respect to the onset of the performance of the method. In a following step S1, general information and/or a general and/or generic behavior model is read and recalled from a predefined data base DB. On the basis of this primary information obtained from the data base DB, the initial operation of the method and system is constructed.

In the following step S2, an initial status $e_i$ or mood or emotion of a given user is detected as a current status $e_c$: $e_i := e_c$. The detected initial status $e_i$ is internally represented by certain initial status data ISD.

In the following step S3, a desired target status to which the user should be turned to and/or respective target status data TSD are received, obtained and/or generated. Distinct data samples can be obtained from the data base DB or they can be obtained from the user directly or from an external control unit.

In the next step S4, it is checked whether an appropriate learning sample $l = <e_i', a, e_t'>$ approximating in one sense or another a given data triple $<e_i, a, e_t>$ is available, i.e. it is checked on whether or not $l = <e_i', a, e_t'>$ exits in the data base DB with: $l < e_i, a, e_t>$.

If this is the case, the learning sample l is received from the data base DB in step S5 and then in a following step S6 the action a of the learning sample l is extracted and defined as the target action t to be derived: $t := a$. If an appropriate learning sample $l = <e_i', a, e_t'>$ approximating the given data triple $<e_i, a, e_t>$ cannot be found—in particular in the very beginning of the performance of the method or system—a in one sense or another closest sample or learning sample l or generic rules are obtained in step S7 from the given data base DB.

In step S8 an appropriate target action t is derived and generated from the given information and from a process of generalizing a given generic information and/or from the closest learning sample.

After step S6 and/or step S8, i.e. before step S9, the target action may be modified according to some modification rule and/or randomly.

In a next step S9 the performance of the derived target action t is set and initialized.

Then in a following step S10 the final status $e_f$ of the user as a result of the target action t taken place is detected and in the step S11 the data triple $<e_i, t, e_f>$ is recalled and evaluated as a new learning sample l.

In the next step S12, the obtained final status $e_f$ of the user is compared with the desired target status $e_t$. Evaluation and comparison data are obtained and recorded and stored together with a new learning sample $<e_i, t, e_f>$ in the given data base DB. The method then returns to the repetition of step S2 and the following steps until the external control or the user terminates the prosecution of the method and the system.

Figure 2:
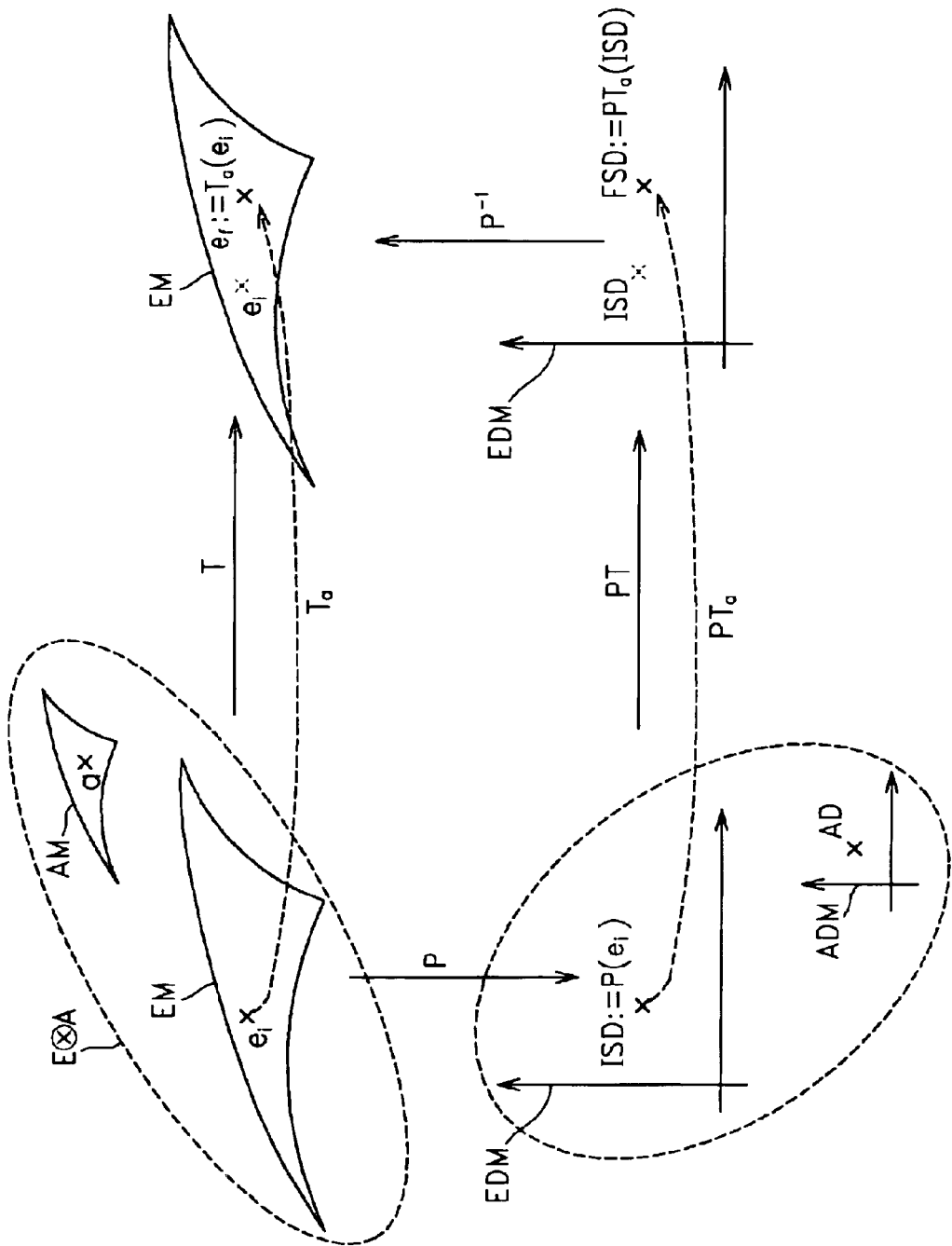
FIG. 2 is a diagram which shows the connection of the different topological manifolds and the mapping between them.

FIG. 2 is a schematic diagram showing the interconnection between the emotion manifolds EM, emotion data manifolds EDM, action manifolds AM, and action data manifolds ADM.

In the upper part of FIG. 2 the Cartesian or tensor product E⊕A—which is constituted by an emotion manifold E of an user and an action manifold AM characterizing the man-machine-interface unit or the like—is connected with the emotion manifold or map via a so-called transmotion mapping T which is in general specific for a given user. Each pair $<e_i, a> \in E \oplus A$—where $e_i$ is a given initial status or emotion of the user and a is an potential action of the system—is mapped via the transmotion mapping T onto at least one final status or emotion $e_f E$ of the user with $e_f := T(e_i, a)$. Due to the definition $Ta(e_i) := T(e_i, a)$, the action manifold generates a family Ta of mappings from E into E.

Via a projection operator or process P one arrives at the lower or internal representation part for the emotion an action manifolds EM an AM, namely to the corresponding emotion data manifold or map EDM and the corresponding action data manifold or map ADM, which are in this example represented by Cartesian coordinate systems.

The initial status data ISD are therefore generated from the initial status $e_i$ by means of a measuring, detecting, and representation generating process, i.e. the projection process P, with ISD:=P($e_i$). Additionally, appropriate transmotion data mappings PT and $PT_a$ are defined. Here a final status $e_f$ is projected to the emotion data manifold by FSD:=P($e_f$). The final status data FSD are connected to the initial status data ISD via: FSD:=PTa(ISD).

To increase the performance of the inventive method for multiple user appliances an user identification process may be involved. The user identification may be based on a speech recognition and/or auditory emotion detection system or process.

(2) Application to Robot Apparatus

The above-described method and system for controlling the man-machine interface unit finds application in an autonomous type robot apparatus having at least an emotional model and which is capable of changing the action to be executed depending on the feeling.

One of the most important and fundamental functions required of the robot apparatus, such as this entertainment robot, is the understanding of the feeling of the human being (Picard R. (1997) Affective Computing, MIT Press). In particular, it is required of the robot apparatus to recognize the feeling of the human being and also to express the robot's own feeling.

It is noted that, if the robot apparatus is able to change its action responsive to the feeling of the human being as user, it enhances the amicability with the human being extremely effectively. Moreover, if, by the application of the above-described man-machine interface unit, not only sociability may be enhanced, but also the feeling of the human being may be led to the feeling desired by the robot apparatus, it is possible to enlarge the extent of the interaction of the robot apparatus with the human being from the side robot apparatus. This function is manifested particularly effectively in a robot apparatus having the learning function.

Thus, the structure of an autonomous robot apparatus, having the feeling model and which is capable of changing the action it expresses depending on the feeling, is first explained, and essential portions of the robot apparatus to which are applied the method and system for controlling the man-machine interface unit are subsequently explained. Although the following explanation is directed to a so-called pet type robot of the type walking on four feet, any suitable robot apparatus may be used which operates responsive to the feeling model. The performance means is also not limited to walking on four legs or even to the legged performance system.

(2-1) Structure of Robot Apparatus

Figure 3:
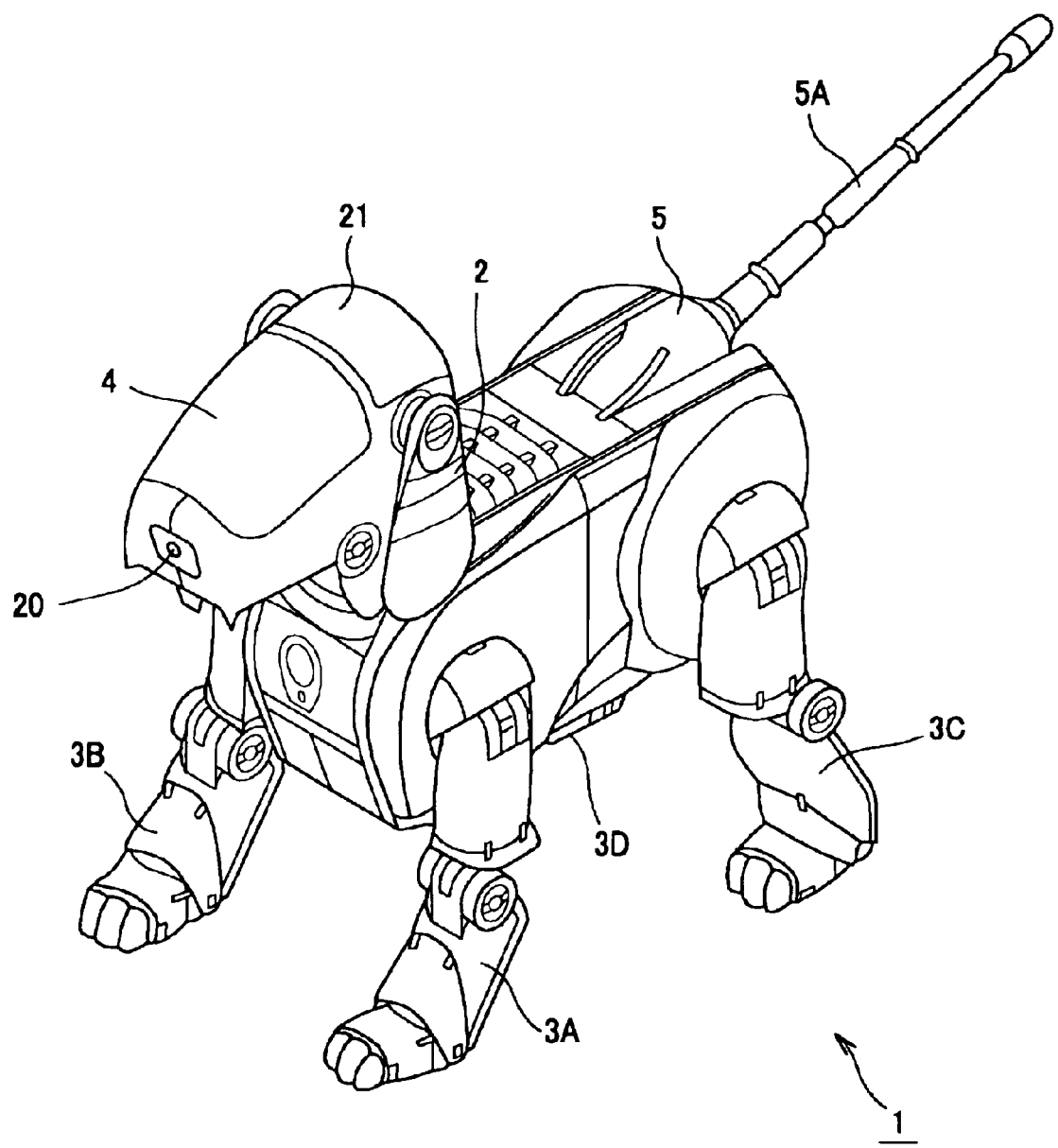
FIG. 3 is a perspective view showing the appearance of a robot apparatus embodying the present invention.

As shown in FIG. 3, the robot apparatus is a so-called pet robot, simulating an animal, such as a 'dog', and is constructed by leg units 3A, 3B, 3C and 3D, connected to the front and rear sides of a trunk unit 2, and by a head unit 4 and a tail unit 5, connected to the front and rear ends of the trunk unit 2, respectively.

Figure 4:
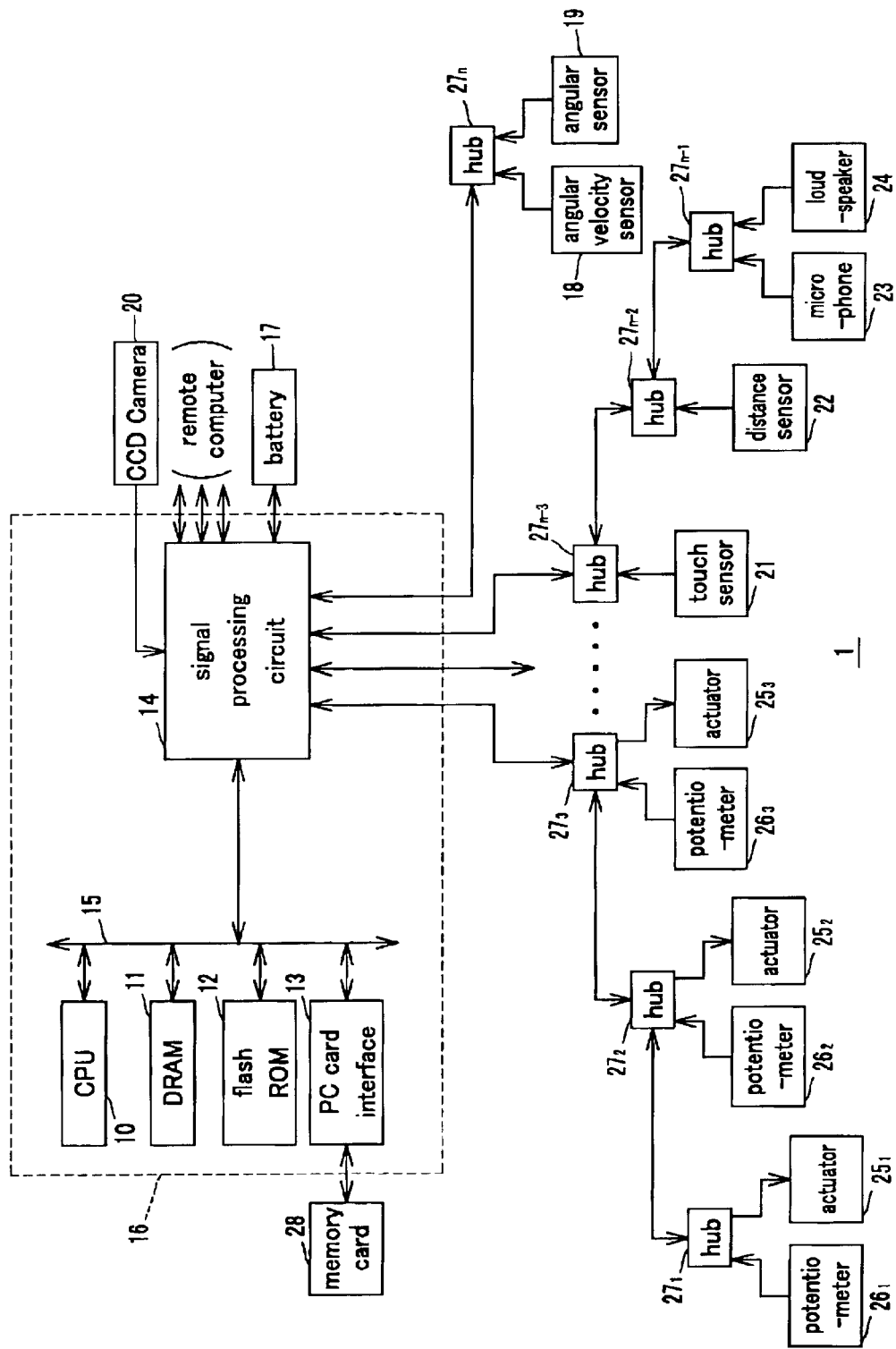
FIG. 4 is a block diagram showing a circuit structure of the robot apparatus.

Referring to FIG. 4, the trunk unit 2 includes a controller unit 16, comprised of an interconnection over an internal bus 15 of a CPU (central processing unit) 10, a DRAM (dynamic random access memory) 11, a flash ROM (read-only memory) 12, a PC (personal computer) card interface circuit 13 and a signal processing circuit 14, and a battery 17 as a power supply for the robot apparatus 1. In the trunk unit 2 are also housed an angular velocity sensor 18 and an acceleration sensor 19 for detecting the orientation and the acceleration of performance of the robot apparatus 1.

On the head unit 4, there are mounted, in position, a CCD (charge coupled device) camera 20 for imaging an outside status, a touch sensor 21, for detecting the pressure resulting from a physical action, such as 'stroking' or 'patting' from the user, a distance sensor 22 for measuring the distance to an object, positioned ahead, a microphone 23 for collecting the external sound, a loudspeaker 24 for outputting the sound, like whining, and LEDs (light emitting diodes) equivalent to the 'eyes' of the robot apparatus 1.

The joint portions of the leg units 3A to 3D, connecting portions of the leg units 3A to 3D and the trunk unit 2, connecting portions of the head unit 4 and the trunk unit 2 and the connecting portion of a tail 5A of the tail unit 5, are provided with a number of actuators $25_1$ to $25_n$ and with potentiometers $26_1$ to $26_n$ corresponding to the number of the degrees of freedom. For example, the actuators $25_1$ to $25_n$ include servo motors as constituent elements. The leg units 3A to 3D are controlled by the driving of the servo motors to transfer to a targeted orientation or performance.

The sensors, such as the angular velocity sensor 18, acceleration sensor 19, touch sensor 21, distance sensor 22, microphone 23, loudspeaker 24 and the potentiometers $26_1$ to $26_n$, and LED and the actuators $25_1$ to $25_n$, are connected via associated hubs $27_1$ to $27_n$ to the signal processing circuit 14 of the controller 16, while the CCD camera 20 and the battery 17 are connected directly to the signal processing circuit 14.

The signal processing circuit 14 sequentially captures sensor data, picture data or speech data, furnished from the above-mentioned respective sensors, to cause the data to be sequentially stored over internal bus 15 in preset locations in the DRAM 11. In addition, the signal processing circuit 14 sequentially takes residual battery capacity data indicating the residual battery capacity supplied from the battery 17 to store the data thus taken in preset locations in the DRAM 11.

The respective sensor data, picture data, speech data and the residual battery capacity data, thus stored in the DRAM 11, are subsequently utilized when the CPU 10 performs actional control of the robot apparatus 1.

In actuality, in an initial stage of power up of the robot apparatus 1, the CPU 10 reads out a memory card 28 loaded in a PC card slot, not shown, of the trunk unit 2, or a control program stored in the flash ROM 12, either directly or through a PC card interface circuit 13, for storage in the DRAM 11.

The CPU 10 then checks its own status and surrounding statuses, and the possible presence of commands or actions from the user, based on the sensor data, picture data, speech data or residual battery capacity data, sequentially stored from the signal processing circuit 14 to the DRAM 11.

The CPU 10 also determines the next ensuing actions, based on the verified results and on the control program stored in the DRAM 11, while driving the actuators $25_1$ to $25_n$, as necessary, based on the so determined results, to produce actions, such as swinging the head unit 4 in the up-and-down direction or in the left-and-right direction, or moving the leg units 3A to 3D for walking or jumping.

The CPU 10 generates speech data as necessary and sends the so generated data through the signal processing circuit 14 as speech signals to the loudspeaker 24 to output the speech derived from the speech signals to outside or turns on/off or flicker the LEDs.

In this manner, the present robot apparatus 1 is able to behave autonomously responsive to its own status and to surrounding statuses, or to commands or actions from the user.

(2-2) Software Structure of Control Program

Figure 5:
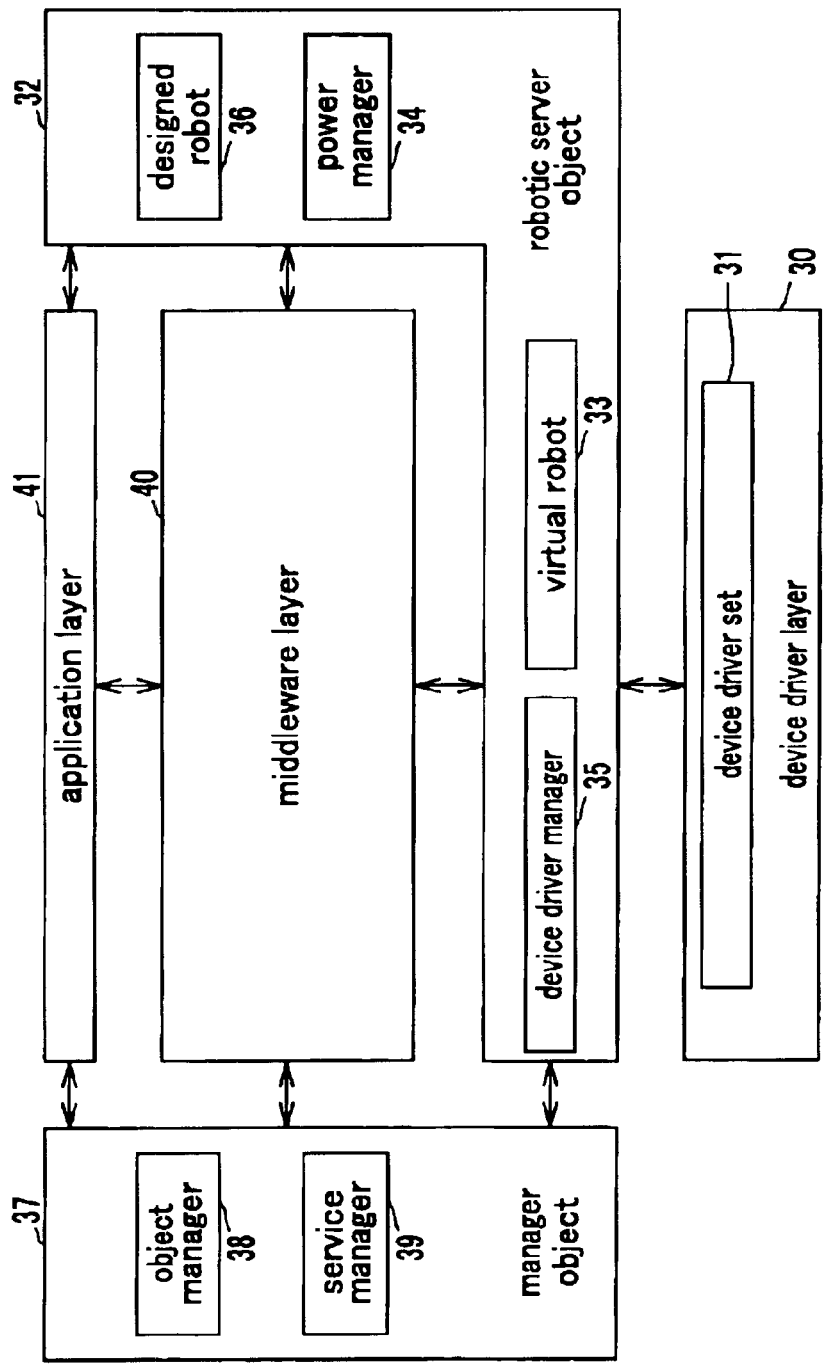
FIG. 5 is a block diagram showing a software structure of the robot apparatus.

FIG. 5 shows the software structure of the above-mentioned control program in the robot apparatus 1. In FIG.

5, a device driver layer 30 is positioned in the lowermost layer of the control program, and is formed as a device driver set 31 made up by plural device drivers. Each device driver is an object allowed to directly access the hardware used in a routine computer, such as a CCD camera 20 (FIG. 4) or a timer, and performs the processing responsive to interruption from an associated hardware.

A robotics server object 32 is made up by a virtual robot 33, a power manager 34, comprised of a set of software items responsible for switching between power sources, a device driver manager 35, comprised of a set of software items, supervising various other device drivers, and a designed robot 36, comprised of a set of software items supervising the mechanism of the robot apparatus 1. The virtual robot 33, located in the lowermost layer of the device driver layer 30, is comprised of a set of software items furnishing an interface for accessing the hardware items, including the above-mentioned various sensors and actuators 25, to 25n.

A manager object 37 is made up by an object manager 38 and a service manager 39. The object manager 38 is a set of software items supervising the booting and the end of respective software items included in the robotics server object 32, a middle ware layer 40 and an application layer 41, while the service manager 39 is a set of software items supervising the connection to respective objects based on the information on the connection among respective objects stated in a connection file stored in a memory card 28 (FIG. 4).

The middle ware layer 40 is positioned as an upper layer of the robotics server object 32, and is made up by a set of software items providing basic functions of the robot apparatus 1, such as picture processing or speech processing. The application layer 41 is located as an upper layer of the middle ware layer 40, and is a set of software items for deciding on the behavior of the robot apparatus 1 based on the results of the processing by the software items making up the middle ware layer 40.

Figure 6:
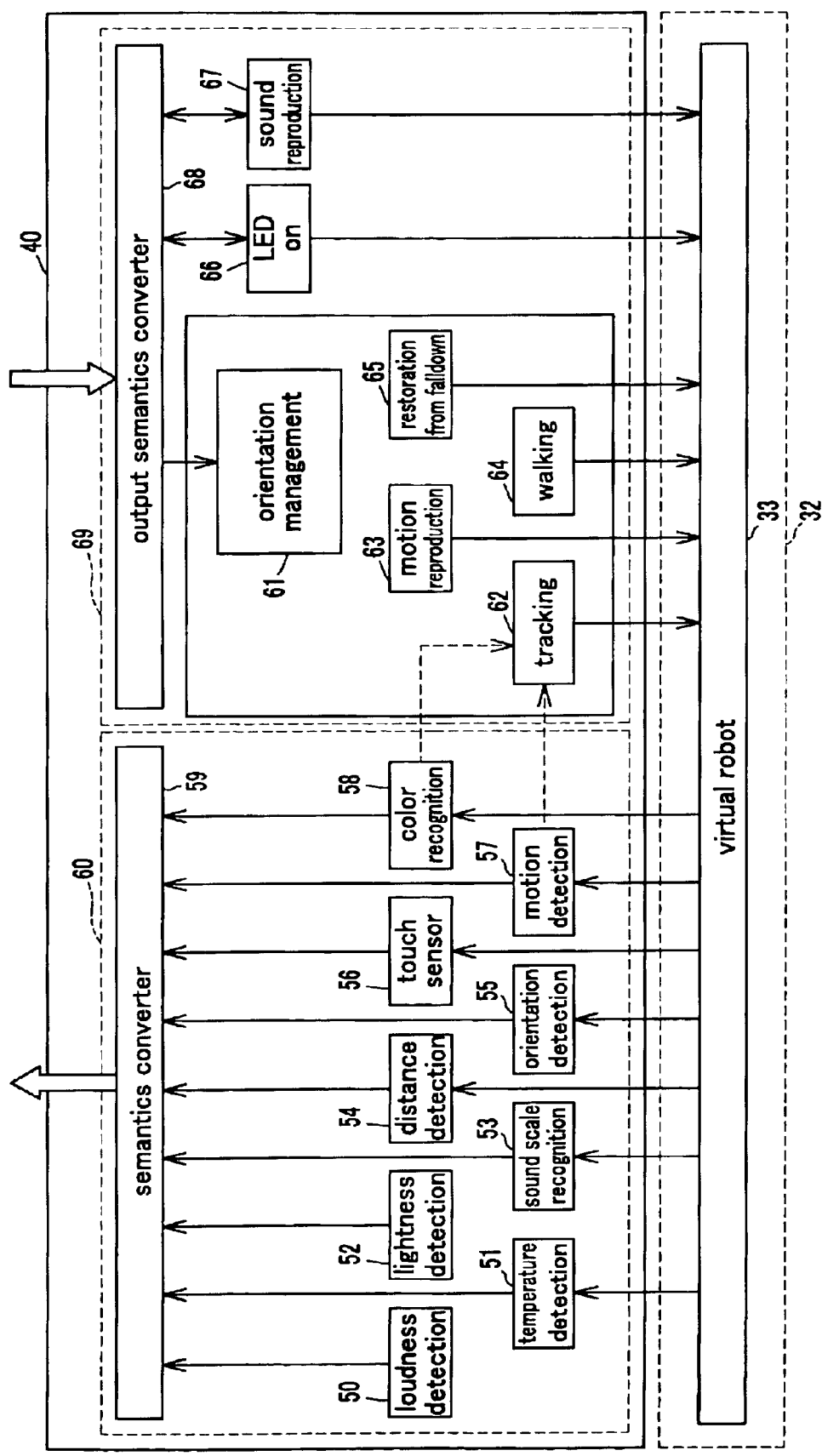
FIG. 6 is a block diagram showing the structure of a middleware layer of the software structure of the robot apparatus.

FIG. 6 shows specified software structures of the middle ware layer 40 and the application layer 41.

Referring to FIG. 6, the middle ware layer 40 is made up by a recognition system 60, having signal processing modules 50 to 58 for noise-, temperature- or lightness detection, sound scale recognition, distance- or orientation detection, for a touch sensor, for motion detection and for color recognition, and an input semantics converter module 68, and by an outputting system 69, having an output semantics converter module 68 and signal processing modules 61 to 67 for orientation management, tracking, motion reproduction, walking, restoration from the falldown status, LED lighting and for sound reproduction.

The signal processing modules 50 to 58 of the recognition system 60 takes relevant data from the sensor data, picture data and the speech data, read out by the virtual robot 33 of the robotics server object 32 from the DRAM 11 (FIG. 4), to process the data, and routes the processed results to the input semantics converter module 59. It is noted that the virtual robot 33 is constructed as a component for exchanging or converting signals in accordance with a preset communication protocol.

The input semantics converter module 59 recognizes the own status, the surrounding status, user's commands or actions, such as 'annoying', 'sultry', 'light', 'a ball has been detected', 'falldown is detected', 'stroked', 'patted', 'do-mi-so scale has been heard', 'a moving object has been detected', or 'an obstacle has been detected' to output the results of recognition to the application layer 41 (FIG. 5).

Figure 7:
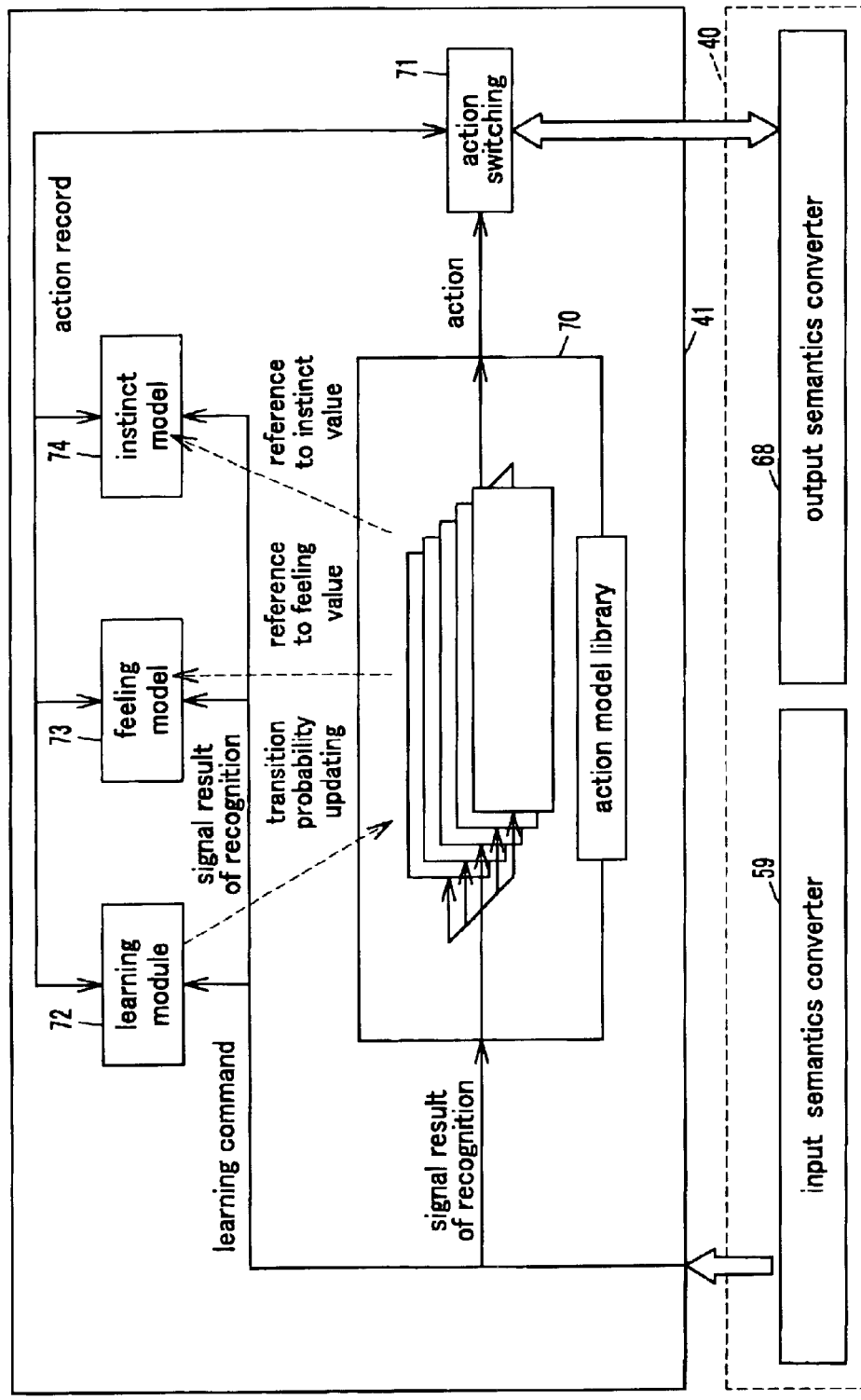
FIG. 7 is a block diagram showing the structure of an application layer of the software structure of the robot apparatus.

The application layer 41 is made up by five modules, namely a behavior model library 70, a behavior switching module 71, a learning module 72, a feeling model 73 and an instinct model 74, as shown in FIG. 7.

Figure 8:
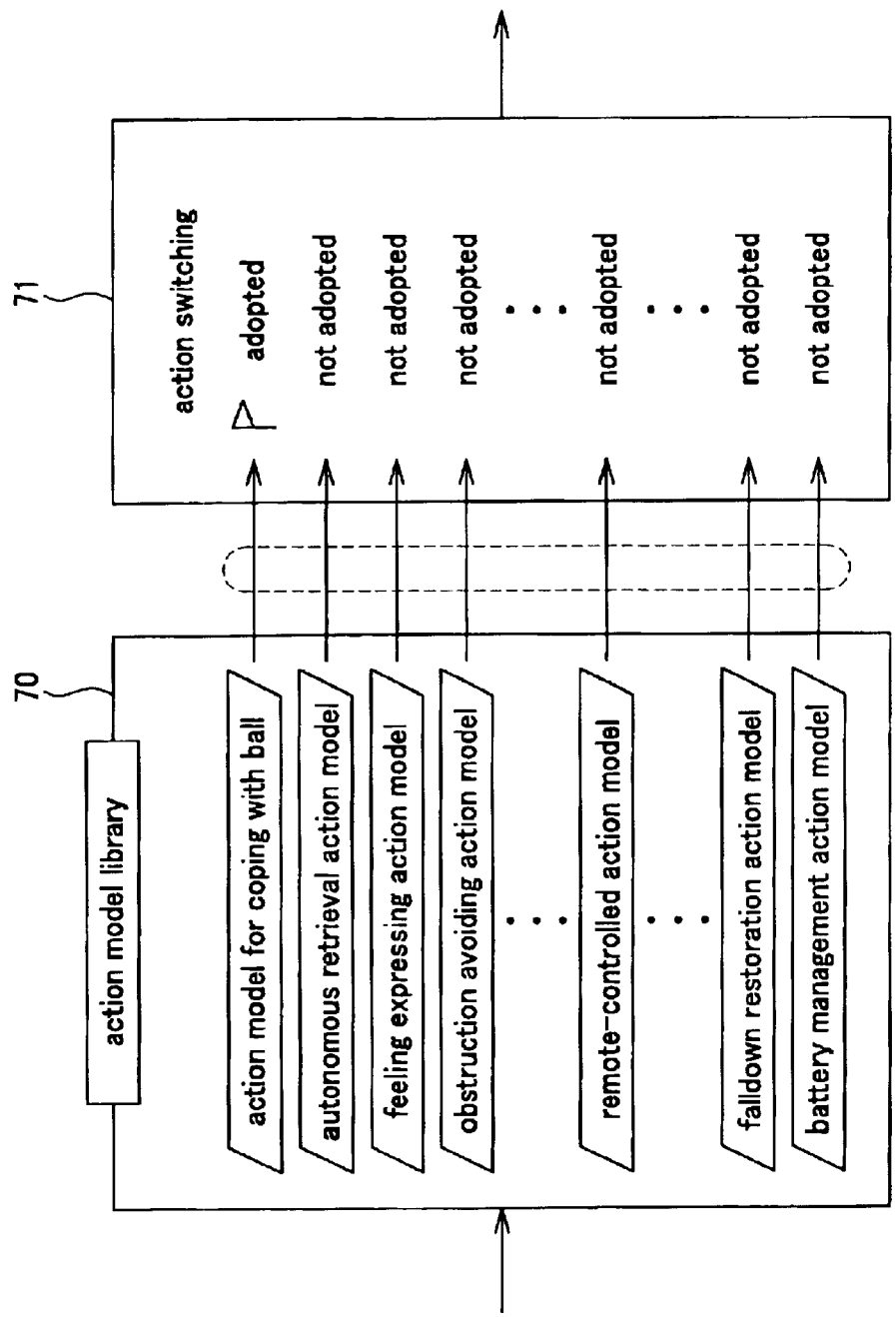
FIG. 8 is a block diagram showing the structure of a behavior model library of the application layer.

In the behavior model library 70, there are provided respective independent behavior models $70_1$ to $70_n$ in association with plural pre-selected condition items, such as 'residual battery capacity is small', 'restoration from the faildown status', 'an obstacle is to be evaded', 'the feeling is to be expressed' or 'a ball has been detected', as shown in FIG. 8.

When the results of recognition are provided from the input semantics converter module 59 or a preset time has elapsed as from the time the last results of recognition were provided, the behavior models $70_1$ to $70_n$ decide on the next behaviors, as they refer to parameter values of the emotion as held by the feeling model 73 and to parameter values of the corresponding desires as held by the instinct model 74, to send the results of decision to the behavior switching module 71.

Figure 9:
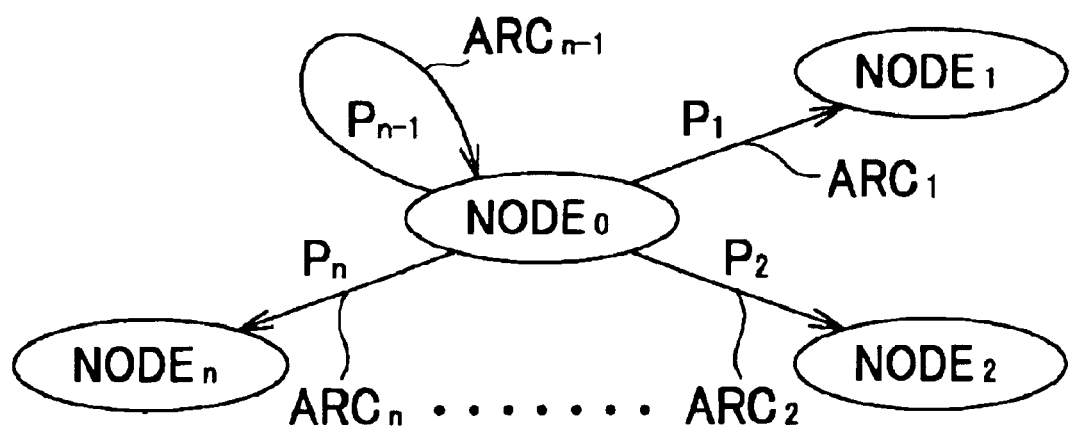
FIG. 9 shows a finite probability automaton which serves as the information for determining the behavior of the robot apparatus.

In the present embodiment, the behavior models $70_1$ to $70_n$ use an algorithm, termed finite probability automaton, as a technique of deciding on the next behavior. This algorithm probabilistically determines from which one of the nodes (statuses) $NODE_0$ to $NODE_n$, as shown in FIG. 9, to which one of these nodes $NODE_0$ to $NODE_n$ transition is to be made, based on the values of the transition probability $P_1$ to $P_n$ as set for the arcs $ARC_1$ to $ARC_n$ interconnecting the respective nodes $NODE_0$ to $NODE_n$.

Specifically, each of the behavior models $70_1$ to $70_n$ includes a status transition table 80, shown in FIG. 10, for each of the nodes $NODE_0$ to $NODE_n$, forming the own behavior models $70_1$ to $70_n$, in association with these nodes $NODE_0$ to $NODE_n$.

In the status transition table 80, input events (results of recognition), as the conditions for transition in the nodes $NODE_0$ to $NODE_n$, are listed in the column of the 'input event name', in the priority order, and further conditions for the transition condition are stated in associated rows of the columns 'data name' and 'data range'.

Thus, in the node $NODE_{100}$, shown in the status transition table 80 of FIG. 10, given the results of recognition 'ball has been detected' (BALL), the ball size (SIZE) being 'from 0 to 1000', as given along with the results of recognition, represents a condition for transition to another node. Similarly, given the results of recognition 'an obstacle has been detected' (OBSTACLE), the distance (DISTANCE) to the obstacle being in a range 'from 0 to 100', as given along with the results of recognition, represents a condition for transition to another node.

Also, in the present node $NODE_{100}$, if no results of recognition are input, but any one of the parameter values 'joy' (JOY), surprise (SURPRISE) or 'sadness' (SADNESS) among the parameter values of the respective emotion and desires, as held in the feeling model 73, among the parameter values periodically referenced by the behavior models $70_1$ to $70_n$, is in a range between'50 and 100', transition may be made to another node.

Moreover, in the status transition table 80, the node names to which transition can be made from the node $NODE_0$ to $NODE_n$ are shown in the row 'nodes of destination of transition' in the column 'probability of transition to other nodes'. Additionally, the probability of the transition to other nodes $NODE_0$ to $NODE_n$, enabled when all conditions stated in the columns 'input event name', 'data name' and 'data range' are met, is entered in corresponding locations in the column 'probability of transition to other nodes'. The behaviors to be output on the occasion of transition to the nodes $NODE_0$ to $NODE_n$ are indicated in the row 'output behavior' in the column 'probability of transition to other nodes'. Meanwhile, the sum of the probability values of each row in the column 'probability of transition to other nodes' is 100%.

Thus, in the node $NODE_{100}$ represented by the status transition table 80 of FIG. 10, given the results of recognition that 'the ball has been detected' and that the size (SIZE) of the ball is in a range from '0 to 1000', transition to the 'node $NODE_{120}$ (node 120)' can be made with the probability of 30%, and the behavior 'ACTION 1' is then output.

In each of the behavior models $70_1$ to $70_n$, a plural number of the sets of the nodes $NODE_0$ to $NODE_n$, each stated as this status transition table 80, are concatenated together, such that, given the results of recognition from the input semantics converter module 59, the next behavior is stochastically determined by exploiting the status transition tables of the $NODE_0$ to $NODE_n$ and the results of the decision are output to the behavior switching module 71.

The behavior switching module 71, shown in FIG. 7, sends to the output semantics converter module 68 of the middle ware layer 40 a command to select the behavior output from one of the behavior models $70_1$ to $70_n$, having a preset high priority order, among the behaviors output from the respective behavior models $70_1$ to $70_n$ of the behavior model library 70, and to execute the behavior. This command is referred to below as a behavior command. In the present embodiment, the order of priority of a given one of the behavior models $70_1$ to $70_n$ shown in FIG. 8 is the higher the lower the rank of the behavior model in question in FIG. 8.

The behavior switching module 71 notifies the learning module 72, feeling model 73 and the instinct model 74 of the effect of the termination of the behavior, based on the behavior completion information afforded from the output semantics converter module 68 after the end of the behavior.

The learning module 72 is fed with the results of recognition of the instructions received as an action from a user, such as 'patting' or 'stroking', from among the results of recognition provided from the input semantics converter module 59.

The learning module 72 changes the probability of transition of the behavior models $70_1$ to $70_n$ in the behavior model library 70, based on the results of recognition and on the notification from the behavior switching module 71, such that, when the action is 'patting' ('scolding') or 'stroking' ('praising'), the probability of occurrence of the behavior in question will be increased or decreased, respectively.

On the other hand, the feeling model 73 is holding parameters representing the intensity of each of the six emotion types, namely joy (JOY), sadness (SADNESS), anger (ANGER), surprise (SURPRISE), disgust (DISGUST) and fear (FEAR). The feeling model 73 periodically updates the parameter values of these emotion types, based on the particular results of recognition provided by the input semantics converter module 59, such as 'patted' or 'stroked', time elapsed and on the notification from the behavior switching module 71.

Specifically, the feeling model 73 calculates a parameter value E[t+1] of the current emotion type for the next period in accordance with the following equation (2):

$$E[t+1]=E[t]+k_e \times \Delta E[t] \qquad (2)$$

where ΔE[t] in the amount of variation of the emotion type as calculated by a preset equation based on, for example, the results of recognition provided by the input semantics converter module 59, the behavior of the robot apparatus 1 at the pertinent time or on the time elapsed as from the previous updating event, E[t] is the current parameter value of the emotional type and $k_e$ is a coefficient representing the sensitivity of the emotion type. The feeling model 73 substitutes the so calculated value for the current parameter value E[t] of the emotion type to update the parameter value of the emotion type. In similar manner, the feeling model 73 updates the parameter values of the totality of the emotion types.

Which effect the respective results of recognition and the notification from the output semantics converter module 68 will have on the variation of the parameter values of the respective emotion types ΔE[t] is has been set beforehand, in such a manner that the results of recognition 'patted' significantly affects the amount of variation ΔE[t] of the parameter value of the emotion type 'anger', while the results of recognition 'patted' significantly affects the amount of variation ΔE[t] of the parameter value of the emotion type 'joy'.

The notification from the output semantics converter module 68 is the so-called behavior feedback information (behavior end information) and the information concerning the results of occurrence of the behavior. The feeling model 73 also changes the feeling based on this information. For example, the feeling level of anger may be lowered by the act of 'barking'. Meanwhile, the notification from the output semantics converter module 68 is also input to the learning module 72, which then changes the corresponding transition probability of the behavior models 70, to 70 based on this notification.

Meanwhile, the feedback of the results of the behavior may be made by an output of the behavior switching module 71 (behavior seasoned with the feeling).

On the other hand, the instinct model 74 holds the parameters, representing the intensity of five reciprocally independent desires, namely 'desire for exercise' 'desire for affection', 'appetite' and 'curiosity'. The instinct model 74 periodically updates the parameter values of these desires, based on the results of recognition provided from the input semantics converter module 59, time elapsed and on the notification from the behavior switching module 71.

Specifically, as concerns the 'desire for exercise', 'desire for affection' and 'curiosity', the instinct model 74 calculates, at a preset period, the parameter value I [k+1] of these desires at the next period, using the following equation (3):

$$I[k+1]=1[k]+k_i \times \Delta I[k] \qquad (3)$$

where ΔI[k] is the amount of variation of the desire in question at a pertinent time as calculated by a preset equation based on the results of recognition, time elapsed and the notification of the output semantics converter module 68, I[k] is the current parameter value of the desire and ki is the coefficient representing the sensitivity of the desire in question, and substitutes the calculated results for the current parameter value I[k] to update the parameter value of the desire. The instinct model 74 updates the parameter values of the respective desires except the 'appetite'.

The effect of the results of recognition and the notification from the output semantics converter module 68 on the amount of variation ΔI[k] of the parameter values of the respective desires is set beforehand, such that, for example, the notification from the output semantics converter module 68 significantly affects the amount of variation ΔI[k] of the parameter values of 'fatigue'.

In the present embodiment, the parameters of the respective emotion types and the respective desires (instincts) are varied in a range from 0 to 100, while the values of the coefficients $k_c$ and $k_i$ are also set individually for the respective emotion types and for respective desires.

The output semantics converter module 68 of the middle ware layer 40 sends abstract behavior commands, such as 'go ahead', 'joy', 'cry', or 'tracking (track a ball)', provided by the behavior switching module 71 of the application layer 41, as described above, to the signal processing modules 61 to 67 of the output system 69, as shown in FIG. 6.

Given a command for a behavior, the signal processing modules 61 to 67 generates servo command values to be supplied to the associated actuators $25_1$ to $25_n$ (FIG. 4) to execute the behavior, speech data of the sound to be output from the loudspeaker 24 (FIG. 4) and/or driving data to be supplied to the LED of the 'eye', based on the behavior command, and send these data through the virtual robot 33 of the robotics server object 32 and the signal processing circuit 14 (FIG. 4) in this order to the associated actuators $25_1$ to $25_n$, loudspeaker 24 or to the LED.

In this manner, the robot apparatus 1 is able to perform an autonomous behavior, based on the control program, responsive to its own internal status, surrounding status (exterior status) or to the command or action from the user.

(2-3) Relevant Portion in the Robot Apparatus

The essential portions of the robot apparatus 1, to which the above-described method and system for controlling the man-machine interface unit are applied, is hereinafter explained.

Apart from the expression with speech, there are two ways of feeling expression of the human being. These are changes in facial expression (Eckman, P. (1982) Emotions in the human face, Cambridge University press, Cambridge), changes in the voice intonation (Banse, R. and Sherer, K. R., (1966) Acoustic Profiles in Vocal Emotion Expression, Journal of Personality and Social Psychology, 70(3): 614–636).

It is assumed that the robot apparatus 1 of the present embodiment estimates the user's feeling based on the picture signals and/or speech signals obtained from the user to cause the action to be changed based on the estimated results.

Figure 11:
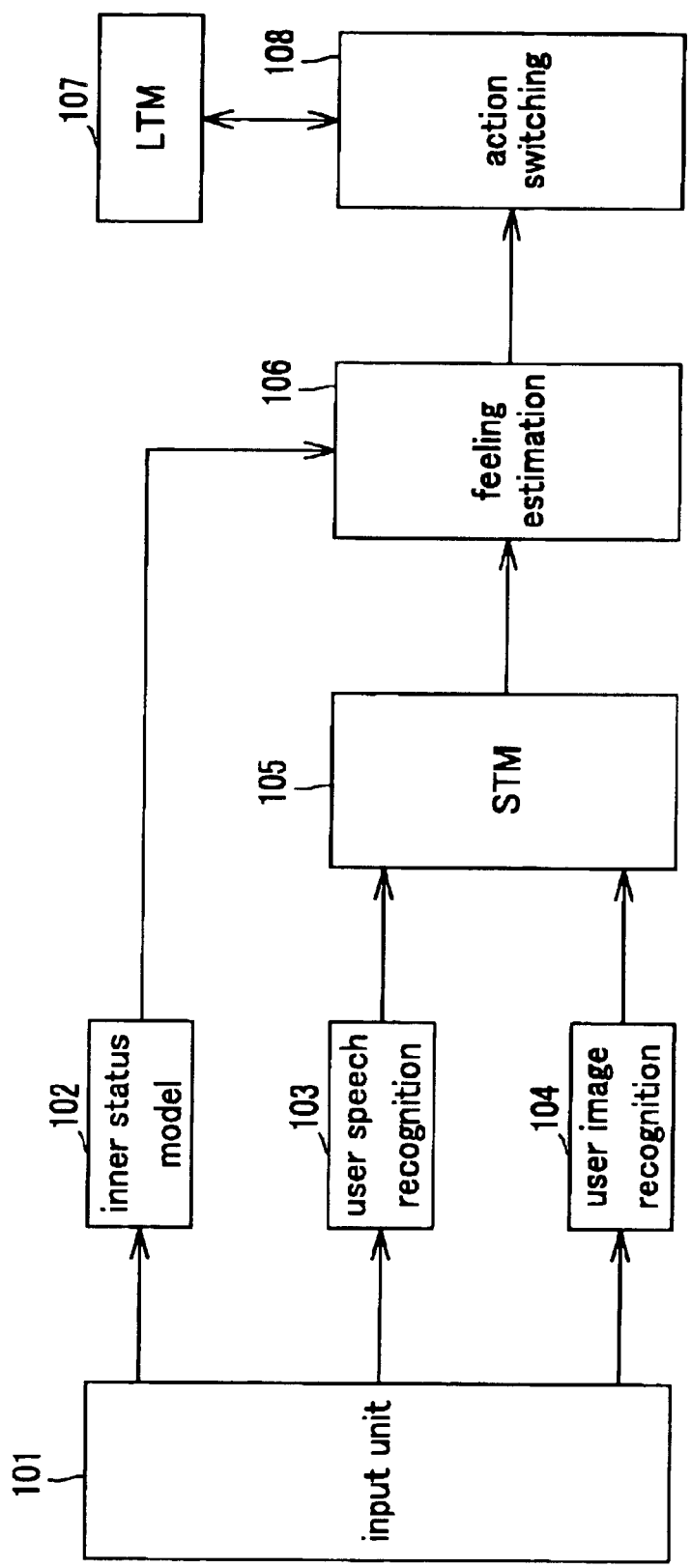
FIG. 11 shows essential portions of the robot apparatus to which has been applied the method for controlling the man-machine interface unit.

Specifically, the robot apparatus 1, as shown in FIG. 11, includes an input unit 101, an internal status model 102, a user speech recognition unit 103, a user image recognition unit 104, a short term memory (STM) 105, a feeling estimation unit 106, a long term memory (LTM) 107 and an action selection unit 108.

To the input unit 101, the sensor information from various sensors, such as touch sensor 21, is input, in addition to picture signals from the CCD camera 20 or speech signals (acoustic signals) from the microphone 23 shown in FIG. 4.

The internal status model 102 corresponds to the feeling model 73 and the instinct model 74, shown in FIG. 7, and sends emotion parameters, representing any of joy (JOY), sadness (SADNESS), anger (ANGER), surprise (SURPRISE), disgust (DISGUST) and fear (FEAR), and desire parameters, representing any of desires for exercise (EXERCISE), affection (AFFECTION), appetite (APPETITE) and curiosity (CURIOSITY), to the feeling estimation unit 106.

When supplied with the speech data, corresponding to the speech uttered by the user, from the input unit 101, the user speech recognition unit 103 detects the feeling, as later explained, based on the intensity of the speech and the fundamental frequency (pitch), to send the sort of the emotion as detected and its likelihood to the short term memory 105.

When supplied with the user image data from the input unit 101, the user image recognition unit 104 extracts the face region from the picture, as later explained, to send the sort of the emotion as detected and its likelihood to the short term memory 105.

The short term memory 105, responsible for short-term storage for the robot apparatus 1, transiently holds the sort and the likelihood of the emotion supplied from the user speech recognition unit 103 and/or the user image recognition unit 104 to send them to the feeling estimation unit 106. It is not necessarily the case that the type and the likelihood of the emotion are supplied from both the user speech recognition unit 103 and the user image recognition unit 104. If the type and the likelihood of the emotion are supplied only from one of these units, the short term memory 105 transiently holds the sort and the likelihood of the supplied emotion. For example, if the user has called to the robot apparatus 1 from its back side, the robot apparatus 1 is unable to recognize the expressions of the user's face. Thus, only the sort and the likelihood of the emotion as detected from the user's voice are sent from the user speech recognition unit 103.

The feeling estimation unit 106 finds the user's current status $e_c$ in the above-described emotion manifold, based on the sort and the likelihood of the emotion as detected by the user speech recognition unit 103 and/or the user image recognition unit 104 and as supplied from the short term memory 105, to send the data to the action selection unit 108. Based on the emotion parameters and on the instinct parameters of the robot apparatus 1, as supplied from the internal status model 102, the feeling estimation unit 106 finds the current status of the robot apparatus 1 in the above-described emotion manifold, to send the data to the action selection unit 108.

The long term memory 107, responsible for long-term storage for the robot apparatus 1, has stored therein pre-learned plural data triples $<e_i, a, e_f>$ as the aforementioned learning sample l.

The action selection unit 108 corresponds to the behavior model library 70 and the behavior switching module 71 shown in FIG. 7. This action selection unit 108 sets the user's current status $e_c$, supplied from the feeling estimation unit 106, as the initial status $e_i$, and reads out the learning samples $<e_i', a, e_f'>$, approximate to data triples $<e_i, *, e_f>$, from the long term memory 107, based on this initial status $e_i$ and on the desired target status $e_f$. The action selection unit 108 sets the action a in the learning samples l as the target behavior t, that is sets t:=a, and selects the target behavior t from the behavior models $70_1$ to $70_n$ to output the so selected target behavior. In the present embodiment, the current status of the robot apparatus 1, supplied from the feeling estimation unit 106, is used as this target status $e_f$. This enables the robot apparatus 1 to switch the own behavior so as to lead the user's feeling status to a feeling status close to the robot's own emotion.

In this manner, the robot apparatus 1 is able to estimate the user's feeling from the user's voice tone or the user's facial expressions and, based on the estimated results, changes over the own action to lead the user's status of feeling to a status of feeling close to the robot's own current emotion.

The feeling recognition processing in the user speech recognition unit 103 and in the user image recognition unit 104, and the processing of behavior selection based on the feeling, are hereinafter explained in detail.

(2-3-1) Voice-Based Feeling Recognition

The user speech recognition unit 103 detects a sum of four emotions, namely the joy/pleasure (JOY/PLEASURE), sorrow/sadness/grief (SORROW/SADNESS/GRIEF), angry (ANGRY) and calmness (CALMNESS), based on the intensity and the fundamental frequency (pitch) of the speech uttered by the user. Meanwhile, the sorts of the emotions detected are of course not limited to the four depicted above. While there are a large variety of algorithms used for classifying the input speech according to respective feelings, as reported by Pierre-yves Oudeyer (Pierre-yves Oudeyer (2001) Algorithm and Features, Proceedings of the Humanoids Conference), a Naive Bayes classification algorithm), is here used as an example.

Figure 12:
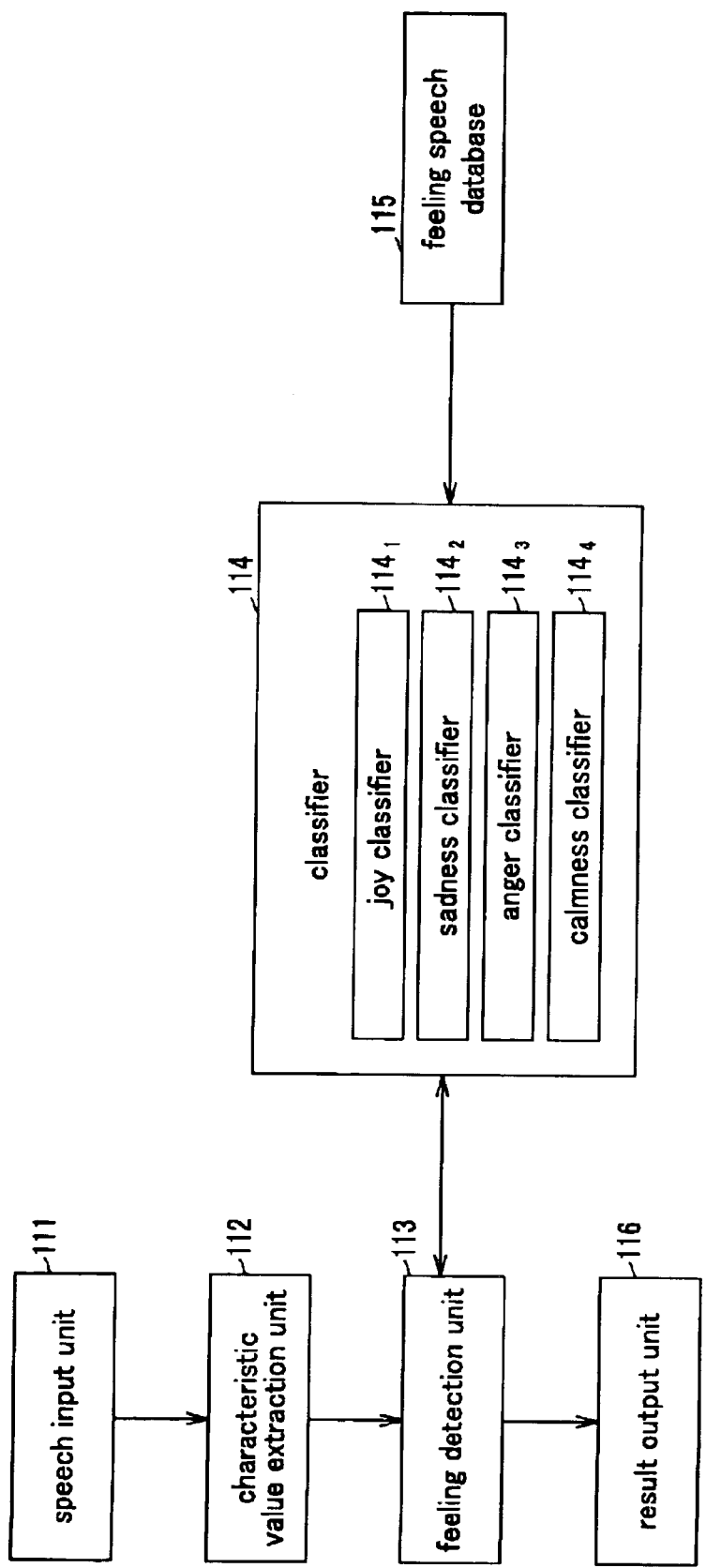
FIG. 12 illustrates the internal structure of a user speech recognition unit of the robot apparatus.

Specifically, the user speech recognition unit 103 includes a speech input unit 111, a characteristic value extraction unit 112, a feeling detection unit 113, a classifier 114, a feeling speech data base 115 and a result output unit 116, as shown in FIG. 12. It should be noted that the classifier 114 includes a joy classifier $114_1$, a sadness classifier $114_2$, an anger classifier $114_3$ and a calmness classifier $114_4$, associated with the aforementioned four emotions, respectively.

Of the speech signals (acoustic signals) from the microphone 23, shown in FIG. 4, the speech uttered by the user is A/D converted into digital speech signals and input to the speech input unit 111. This speech input unit sends the digital speech signals to the characteristic value extraction unit 112.

The characteristic value extraction unit 112 extracts, as characteristic values, the intensity and the pitch of the speech from the digital speech signals supplied from the speech input unit 111. The intensity of the speech is afforded as the signal power, while the pitch of the speech is afforded as the fundamental frequency of the signals. There are a variety of techniques for finding the fundamental frequency, for example, a technique employing the autocorrelation function of the speech waveform or a technique employing the spectrum.

The characteristic value extraction unit 112 extracts the intensity and the pitch of the speech of the digital speech signals at an interval of an extremely short time interval, such as every 10 ms. In this case, the speech intensity is found from the signals passed through low-pass and high-pass filters. As a result, a sequence of 3-dimensional vectors pertinent to the intensity and the pitch of the speech is found for a sole digital speech signal. The characteristic value extraction unit 112 finds an average value, a maximum value, a minimum value, a difference between the maximum and minimum values, a variance and a median value, for each dimension of the sequence of 3-dimensional vectors. The result is that 3×6=18 characteristic values are obtained. The characteristic value extraction unit 112 sends the 18-dimensional vectors to the feeling detection unit 113.

The feeling detection unit 113 classifies the 18-dimensional vectors, supplied from the characteristic value extraction unit 112, into the joy/pleasure (JOY/PLEASURE), sorrow/sadness/grief (SORROW/SADNESS/GRIEF), angry (ANGRY) and calmness (CALMNESS), using the respective classifiers $114_1$ to $114_4$ of the classifier 114, in accordance with the Naive Bayers classification algorithm.

This Naive Bayers classification algorithm is now briefly explained. The problem of finding c_j which maximizes the probability of occurrence (P(c_j|a_1, a_2, ..., a-n) of class c_j for the n-dimensional input vector (a_1, a_2, ..., a-n) is formularized, by the Bayes' theorem, into the problem of finding c_j which maximizes the following equation (4):

$$P(a\_1, a\_2, \ldots, a\_n(c\_j)P(c\_j). \quad (4)$$

Under a hypothesis that there exists independency of the respective dimensions, the above problem is reduced to a problem of finding the class c_j which maximizes the following equation (5):

$$P(a\_1|c\_)P(a\_2|c\_j) \ldots P(a\_n|c\_j)P(c\_j). \quad (5)$$

By modeling P(a_i|c_j), using a probability density function afforded by for example the normal distribution, the occurrence probability of the class c_j may be found for an input vector P(a_1, a_2, ..., a_n).

That is, by calculating the likelihood, using the probability density function associated with respective emotions for each of the above-mentioned 18-dimensional vectors, it is possible to calculate the likelihood of the 18-dimensional vectors associated with the respective emotions.

This probability density function may be estimated using a feeling speech database 115 having stored therein a large number of speech data associated with respective emotions. For example, if there are 1000 utterances of speech data associated with a given feeling, the probability density function represented by the following equation (6):

$$P(x) = \frac{1}{\sqrt{2\pi}\,\sigma}\exp\left\{-\frac{(x-\mu)^2}{2\sigma^2}\right\} \quad (6)$$

may be estimated by extracting the characteristic values (the aforementioned 18-dimensional vectors) for each speech data and by finding the average value p and the variance a from the data associated with respective dimensions of the characteristic value vectors.

The feeling detection uni 113 finds, for the 18-dimensional vectors, supplied from the characteristic value extraction unit 112, the likelihood of each emotion from the probability density function in the joy classifier $114_1$, sadness classifier $114_2$, anger classifier $114_3$ and in the calmness classifier $114_4$. The feeling detection uni 113 compares this likelihood and sends the sort of the emotion with the maximum likelihood and the likelihood as the detecting result to the result output unit 116.

The result output unit 116 outputs the sort of the emotion supplied from the feeling detection uni 113 and the likelihood, supplied from the feeling detection uni 113, to the short term memory 105 shown in FIG. 11.

2-3-2) Feeling Recognition Based on Facial Expressions

Based on the expressions of the user's facial expressions, the user image recognition unit 104 detects a sum of six emotions, namely the joy (JOY), sadness (SADNESS), anger (ANGER), surprise (SURPRISE), disgust (DISGUST) and fear (FEAR). Of course, the sorts of the emotions to be detected are not limited to these six emotions. If the emotion is none of these six emotions, the emotion of calm/neutral (CALM/NEUTRAL) is detected.

For describing the facial expressions, the method for expression description proposed by Ekman and Friesen, and which is called the facial action coding system (FACD), is used in the present embodiment. This FACS classifies the expressions in accordance with minimum units of the expression performances, termed action units (AU), which are (a) analytically independent (expression muscles), (b) visual discernability, and (c) minimum units of expressional operations, and quantitatively describes the human expressions by the combination of the AU intensity values. However that FACS has inherently been proposed for describing and analyzing the expressions in the field of psychology and, as shown in excerpt in FIG. 13, the definitions of the AUs use qualitative expressions.

The expressions demonstrated on occurrence of the above-mentioned respective six emotions are termed basic six expressions. The relevance between these six expressions and the AUs has been clarified by Ekman and Friesen. Meanwhile, this relevance is basically unaffected by the individual difference, such as culture, sex or age. That is, if the human expressions can be classified or recognized by AU, these can be mapped into the aforementioned six emotions.

Thus, the user image recognition unit 104 exploits the FACS coding, as data conversion processing, having picture signals and the AU intensity values as input and output, respectively, to detect the aforementioned six emotions, characterized by the respective AUs, from the input picture signals.

Figure 14:
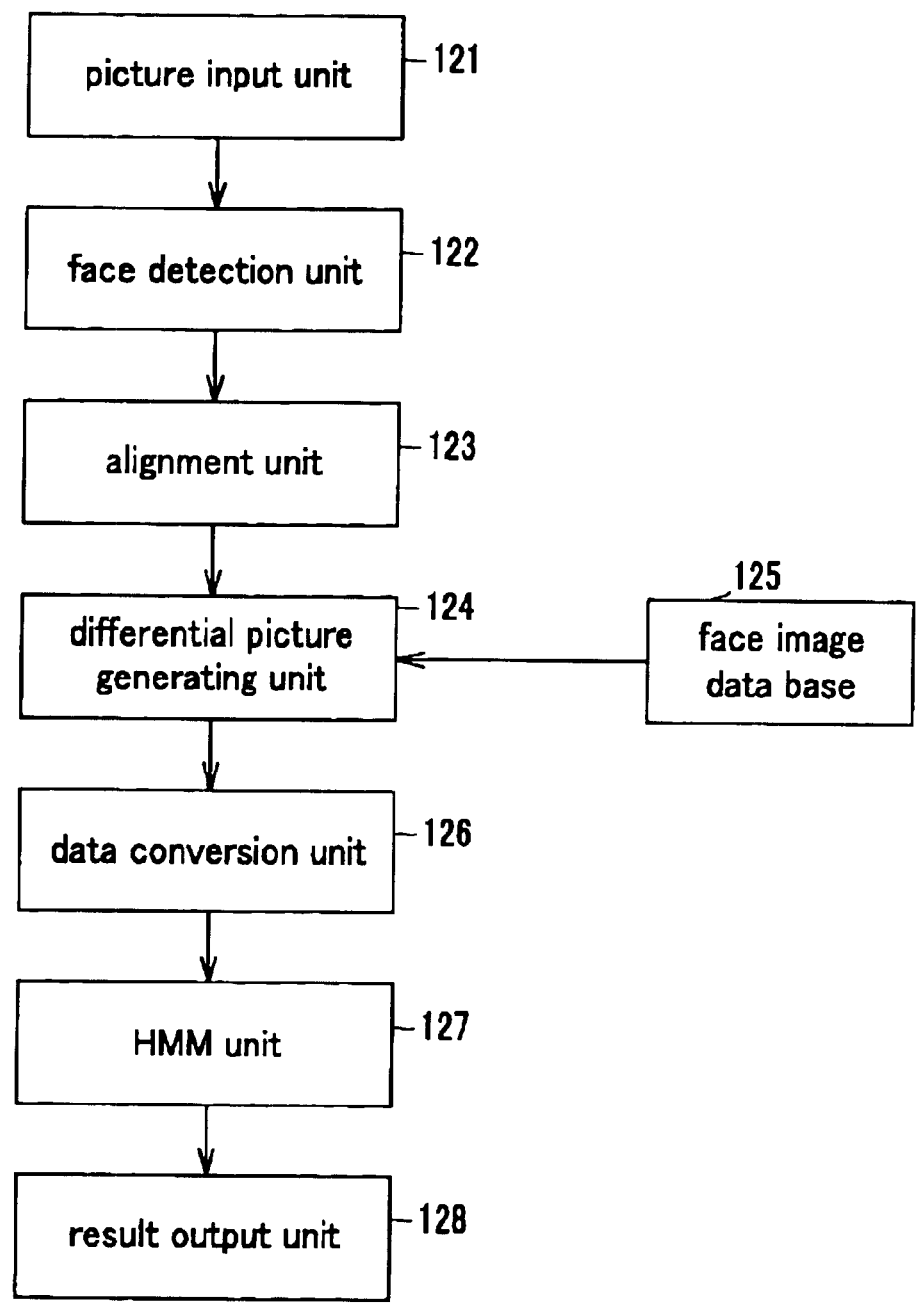
FIG. 14 illustrates the inner structure of the user image recognition unit of the robot apparatus.

Referring to FIG. 14, the user image recognition unit 104 includes a picture input unit 121, a face detection unit 122, an alignment unit 123, a differential picture generating unit 124, a facial image data base 125, a data conversion unit 126, an HMM (hidden Markov model) unit 127, and a result output unit 128.

The picture input unit 121 is supplied with picture signals from the CCD camera 20, shown in FIG. 4, to send the picture signals to the face detection unit 122.

The face detection unit 122 transforms a frame picture, corresponding to picture signals supplied from the picture input unit 121, into plural scale pictures having different contraction ratios. For example, the face detection unit 122 transforms the frame picture by sequentially contracting the frame picture, by factors of 0.8, into scale pictures of five stages (1.0 times, 0.8 times, 0.64 times, 0.51 times and 0.41 times the frame picture size). The face detection unit 122 scans each scale picture starting from the upper left of the picture and proceeding sequentially to the lower right thereof, by shifting a suitable number of pixels towards right or towards below, to slice out a rectangular area of (20× 20)=400 pixels. Moreover, the face detection unit 122 checks whether or not the picture scanned is a face image, by taking matching to a template picture. Since the rectangular areas found at this time point to be a face image, referred to below as a score image, may frequently be a mis-verified non-face picture, the face detection unit 122 verifies face- non-face discrimination by a support vector machine (SVM).

The above-described technique is disclosed e.g., in a report by B. Sholkoph (B. Sholkoph, C. Burges, A. Smola (1999) Advance in Kernel Methods Support Vector Learning, The MIT Press), or in a report by V. Vapnic (V. Vapnic (1999) The Nature of Statistical Learning Theory Second Edition, Springer).

The aforementioned SVM is a learning machine employing a linear discriminator (Perceptron) as a discriminating function and which may be expanded to a non-linear domain by employing a kernel function. Since the learning of the discrimination function is carried out such as to maximize the margin of class-to-class separation, and the solution is obtained by solution using the quadratic mathematical programming method, arrival at a global solution may be theoretically guaranteed. The following are the details of the processing:

In order to remove a non-face background portion from the aforementioned score picture, 360 pixels are extracted from the score picture having 20×20=400 pixels, using a mask corresponding to the picture the four corners of which have been cut off. Then, supposing that the luminosity of an object being imaged is changed by illumination, histogram smoothing or contrast normalization is carried out. An identification function used for face detection then is learned. Using each preset number of the face data and the non-face data, as the learning data, a provisional identification function is first obtained. The identification function, obtained provisionally, then is tested on a variety of images on the data base to detect a face. Those images which were successfully detected to be face images are added to the learning data as face data, while those which resulted in failure are added to the learning data as non-face data and subjected to re-learning.

The face detection unit 122 thus verifies whether or not there are face data in the score picture. If the face data exist, the score picture is sent as face image to the alignment unit 123.

The alignment unit 123 executes alignment processing on a face image supplied from the face detection unit 122. That is, for obtaining a correct difference between two face images in the differential picture generating unit 124 to be described later, the face position needs to be found accurately. Moreover, since the positions of the eyes and the nose in a face differ from person to person, these positions need to be normalized. Consequently, the alignment unit 123 extracts characteristic points, such as eye ends, nostrils or lip ends, of a given face image to identify eye and nose positions. The positions of the eyes and the nose as detected are rotated and expanded/contracted (morphed) by affine transformation to execute alignment processing. The alignment unit 123 sends the face image following alignment to the differential picture generating unit 124.

The differential picture generating unit 124 calculates the difference between the post-alignment face image, supplied from the alignment unit 123, and the post-alignment expressionless (neutral) face image stored in the facial image data base 125 to generate a differential image. The differential picture generating unit 124 sends the generated differential image to the data conversion unit 126.

The data conversion unit 126 performs vector transformation on the 360-pixel score picture, using a Gabor filter, to transform a set of the vectors produced further into a sole characteristic vector.

It has already been known that there exist the cells of the human visual system which exhibit selectivity to a certain specified orientation. These cells are made up by those reacting to a vertical line and those reacting to a horizontal line. The aforementioned Gabor filter is a spatial filter composed of plural filters exhibiting this orientation selectivity.

With filtering at a lower frequency, it may be advisable to decrease the vector dimensions by downsampling because it is redundant to hold the post-filtering images as vectors in their entirety. In this case, the downsampled plural vector sets are arrayed to generate a sole characteristic vector.

The data conversion unit 126 vector-quantizes the feature vectors, obtained on Gabor filtering, to send the resulting vector-quantized characteristic vectors to the HMM unit 127.

The HMM unit 127 classifies the vector-quantized characteristic vectors, supplied from the data conversion unit 126, into one of the joy (JOY), sadness (SADNESS), anger (ANGER), surprise (SURPRISE), disgust (DISGUST) and fear (FEAR). Meanwhile, the HMM unit 127 has been pre-trained with face images expressing respective emotions and finds the likelihood of each emotion for the supplied characteristic vectors. Meanwhile, the respective emotions and the AUs may, for example, be correlated as follows:
joy (JOY) . . . AU6+12
sadness (SADNESS) . . . AU1 and AU 1+4
anger (ANGER) . . . AU4
surprise (SURPRISE) . . . AU1+2 disgust (DISGUST) . . . AU2+4
fear (FEAR) . . . AU2+2+4

The HMM unit 127 compares the likelihoods of respective emotions obtained to one another to send the type of the emotion having the maximum likelihood and the likelihood as detected results to the result output unit 128.

The result output unit 128 outputs the sort of the emotion and the likelihood thereof, supplied from the HMM unit 127, to the short term memory 105 shown in FIG. 11.

In the foregoing, an input to the HMM unit 127 is the characteristic vector obtained on Gabor filtering and which subsequently is processed with vector quantization. This is merely illustrative such that it is also possible to use results of tracking of characteristic points and the motion vector (optical flow) of various face sites as disclosed for example in a report by James J. Lien (Janes J. Lien et al. (1998) Automated Facial Expression Recognition Based on FACS Action Units, proceedings of FG'98, April 14–16).

(2-3-3) Behavior Selection Based on Feeling

The robot apparatus 1 has a total of six emotions, namely joy (JOY), sadness (SADNESS), anger (ANGER), surprise (SURPRISE), disgust (DISGUST) and fear (FEAR), as described above. These respective emotions are associated with spatial regions in a 3-dimensional topological space having three axes of pleasantness (PLEASANTNESS), arousal (AROUSAL) and certainty (CERTAINTY), as shown for example in FIG. 15.

Of these, the [pleasantness] is a parameter indicating the degree of satisfaction of the instinct of the robot apparatus 1. On the other hand, the [arousal] and [certainty] are parameters indicating the degree of awakened or sleeping status of the instinct of the robot apparatus 1 and the degree of certainty or confidence with which the robot apparatus 1 is able to recognize the subject to which the robot apparatus 1 is currently directing its attention.

Figure 16:
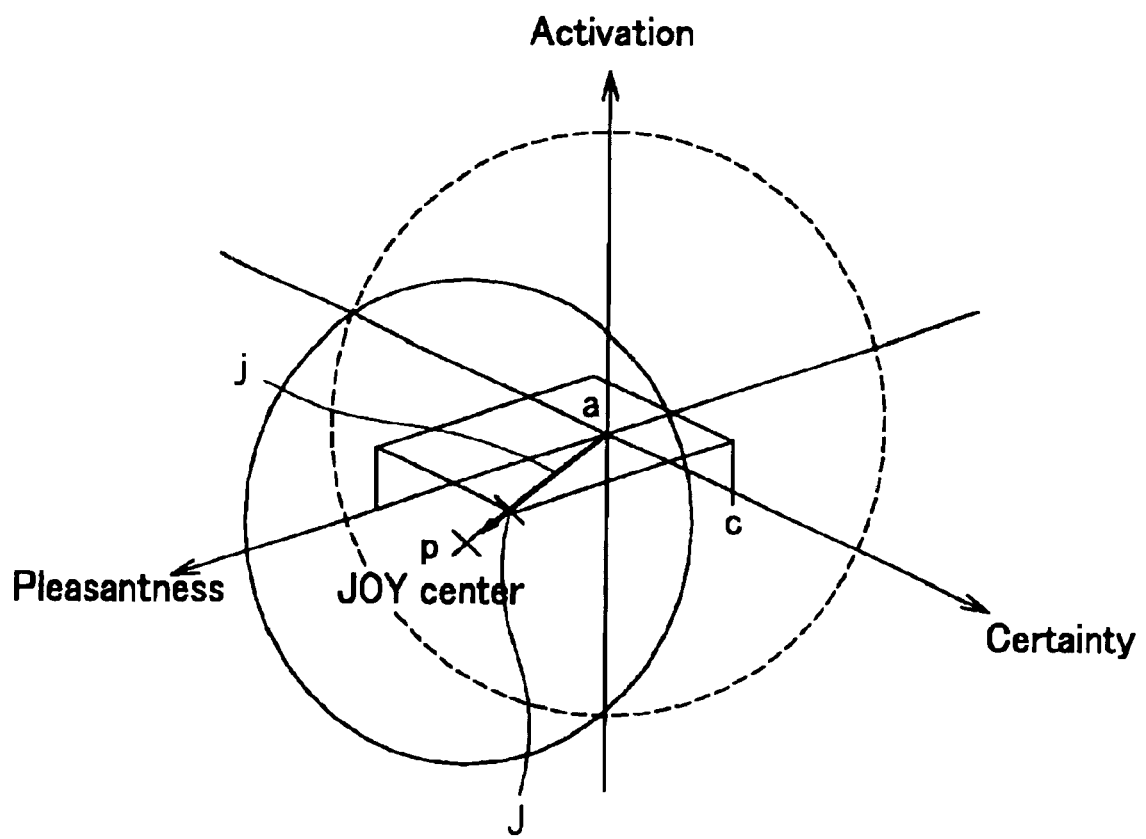
FIG. 16 illustrates an instance in which the emotional status is mapped on a point in the 3-dimensional topological space.

The feeling estimation unit 106, shown in FIG. 11, first maps the user's current feeling on a point in the topological space, based on the sort and the likelihood of the emotion detected by the user speech recognition unit 103 and/or the user image recognition unit 104 and supplied from the short term memory 105. Specifically, when the emotion detected is the joy (JOY), with its likelihood being 0.8, the feeling estimation unit 106 multiplies a vectorj, proceeding from a point of origin of the topological space towards the center of the spatial area corresponding to the detected emotion ofjoy, with the likelihood of 0.8, as shown in FIG. 16. The coordinate J (p, a, c) indicated by the so produced vector is provisionally set as a coordinate specifying the user's current feeling.

Meanwhile, if the likelihood of the emotion detected by the user speech recognition unit 103 differs from the likelihood of the emotion detected by the user image recognition unit 104, the feeling estimation unit 106 is able to map the current feeling using an average value of the two likelihoods. If the emotion detected by the user speech recognition unit 103 differs from the emotion detected by the user image recognition unit 104, the feeling estimation unit 106 is able to map the current feeling into the topological space using only a preset one of the two emotions.

The feeling estimation unit 106 projects a coordinate in the topological space, representing the user's current feeling, on a topological plane having two axes of, for example, [pleasantness] and [arousal], and sets the resulting coordinate as the user's current status $e_c$. Similarly, the feeling estimation unit 106 projects a point in the topological space representing the robot apparatus' current status (feeling) on a topological plane having two axes of [pleasantness] and [arousal] and sets the resulting coordinate as the user's target status $e_t$.

Figure 17:
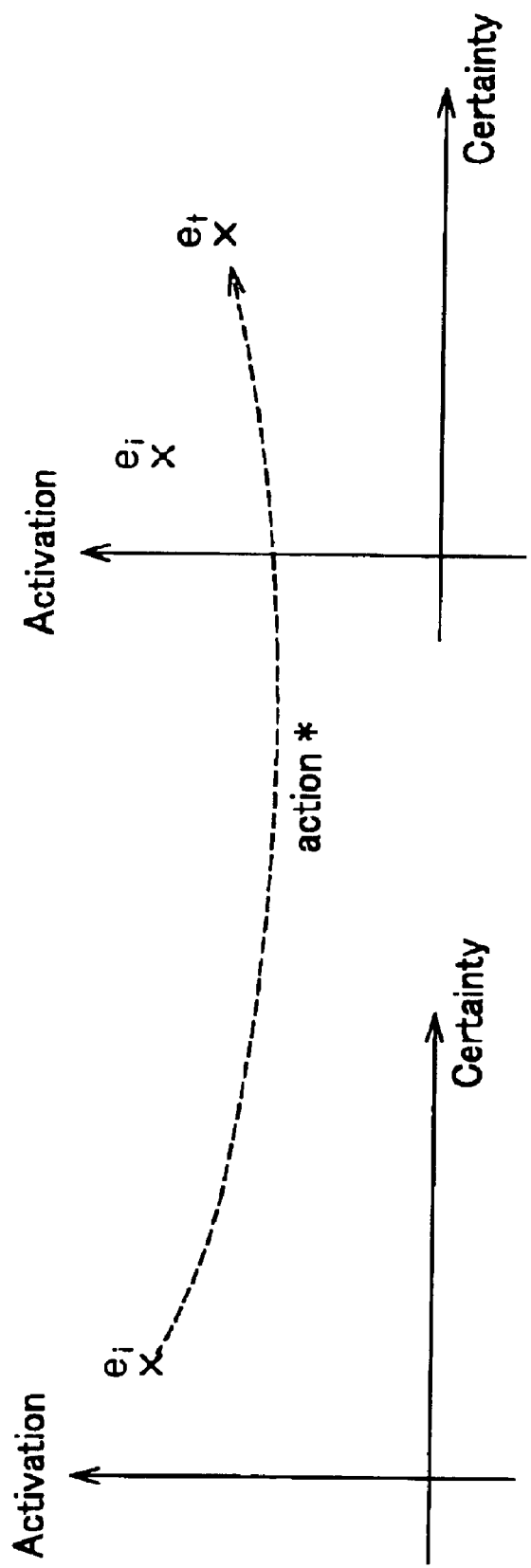
FIG. 17 illustrates the manner in which the initial status on a topological plane is transformed into a target status.

The action selection unit 108 sets the user's current status $e_c$, as supplied from the feeling estimation unit 106, as the initial status $e_i$, and presupposes an action * as being an ideal target action which is to lead the user from this initial status $e_i$ to the target status $e_t$. That is, the initial status $e_i$, afforded as a coordinate on the topological plane having two axes of [pleasantness] and [arousal], is transformed by the action * into a target status $e_t$ afforded as another coordinate on the topological plane, as shown in FIG. 17. The action selection unit 108 reads out the learning sample l=<$e_i'$, a, $e_t'$> approximate to the data triple <$e_i$, *, $e_t$> from the long term memory 107. The action selection unit 108 sets the action a in the learning sample l as a target action t, that is sets t:=a, and selects this target action t from the behavior models $70_1$ to $70_n$ to output the selected behavior model.

In this manner, the robot apparatus 1 changes over its own behavior in order to lead the user's status of feeling to a feeling status close to the robot apparatus' own current emotion.

Figure 18:
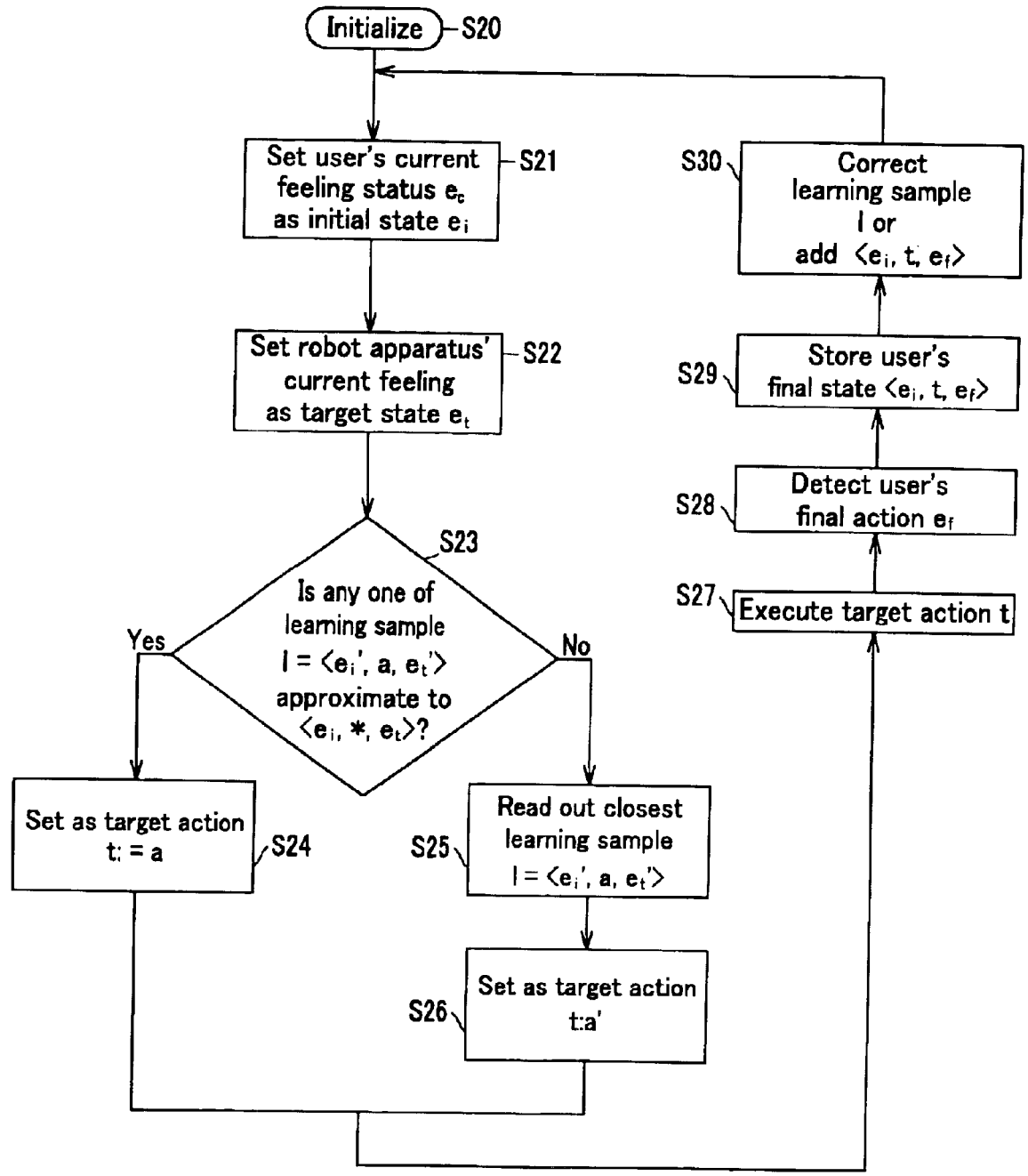
FIG. 18 is a flowchart for illustrating the method for controlling the behavior of the robot apparatus.

The method for controlling the behavior of the robot apparatus 1 described above is now explained with reference to the flowchart of FIG. 18.

First, in a step S20, the robot apparatus 1 is initialized on startup of the action control operations. In a next step S21, the initial status $e_i$, that is the user's current feeling, is detected as the current status $e_c$:$e_i$=$e_c$.

In a next step S22, the current feeling of the robot apparatus 1 is set as the target status $e_t$ to which the user should be led.

In a step S23, it is checked whether or not there is any learning sample close to <$e_i$, *, $e_t$> among the learning samples <$e_i'$, a, $e_t'$> stored in the long term memory 107. Specifically, a distance Dist represented by the following equation (7):

$$\text{Dist} = \text{comp}(<ei, *, ei>, <ei', a, et'>) \qquad (7)$$
$$= \alpha\|ei - ei'\| + \beta\|et - et'\|$$

where α and β are preset constants, is compared to a threshold value Th to check whether or not the distance Dist is smaller than the threshold value Th.

If the distance Dist is smaller than the threshold value Th, it is assumedthat the distance Dist isclose to the threshold value Th. Thus, the learning sample l is read in step S24 from the long term memory 107 and the action to be derived is set as a target action t:=a. On the other hand, if the distance Dis, is not smaller than the threshold value Th, another learning sample l=<$e_i'$, a', $e_t'$> is read out from the long term memory 107. In a step S26, the action to be derived is set as the target behavior t:=a'.

In a next step S27, the target action t derived is carried out.

In a step S28, the final status of the user $e_t$, as being the result of the target action t executed, is detected. In a next step S29, the data triple <$e_i$, t, $e_t$> is transiently stored.

In a next step S30, the learning sample l is corrected or a new data triple <$e_i$, t, $e_t$> is stored in the long term memory 107. For example, the distance $\text{Dist}_1$ between the data triple <$e_i$, *, $e_t$> and the data triple <$e_i'$, a, $e_t'$> is compared to the distance $\text{Dist}_2$ between the data triple <$e_i$, *, $e_t$> and the data triple <$e_i'$, a, $e_t'$>. If the distance $\text{Dist}_1$ is smaller than the distance $\text{Dist}_2$, the data triple <$e_i'$, a, $e_t'$> in the learning sample l is replaced and corrected by a data triple <$e_i''$, a, $e_t''$> defined by the following equation (8):

$$ei''=ei'+k \cdot ei$$
$$et''=et'+k \cdot et \qquad (8)$$

where k is a preset constant such that $|k|<1$. If conversely the distance $Dist_2$ is not smaller than the distance $Dist_1$, the data triple $<e_i, t, e_f>$ is added to the learning sample 1 and stored in the long term memory 107.

The steps as from step S21 is repeated until the execution is terminated by an external control device or by the user.

With the above-described robot apparatus 1, it is possible, by applying the method and the system for controlling the man-machine interface unit, described above, to estimate the user's feeling from the tone of the user's speech or the user's facial expressions, and to lead the status of the user's feeling to a feeling status close to the robot apparatus's own status of feeling, based on the estimated results.

The present invention is not limited to the above-described embodiments, but may be changed variably without departing from its scope.

For example, although the above embodiment is directed to a case where the current status of the feeling of the robot apparatus 1 is the target feeling e, to which the user should be led, this is for the sake of illustration only, such that any desired feeling status can be set as target status $e_t$.

Figure 15:
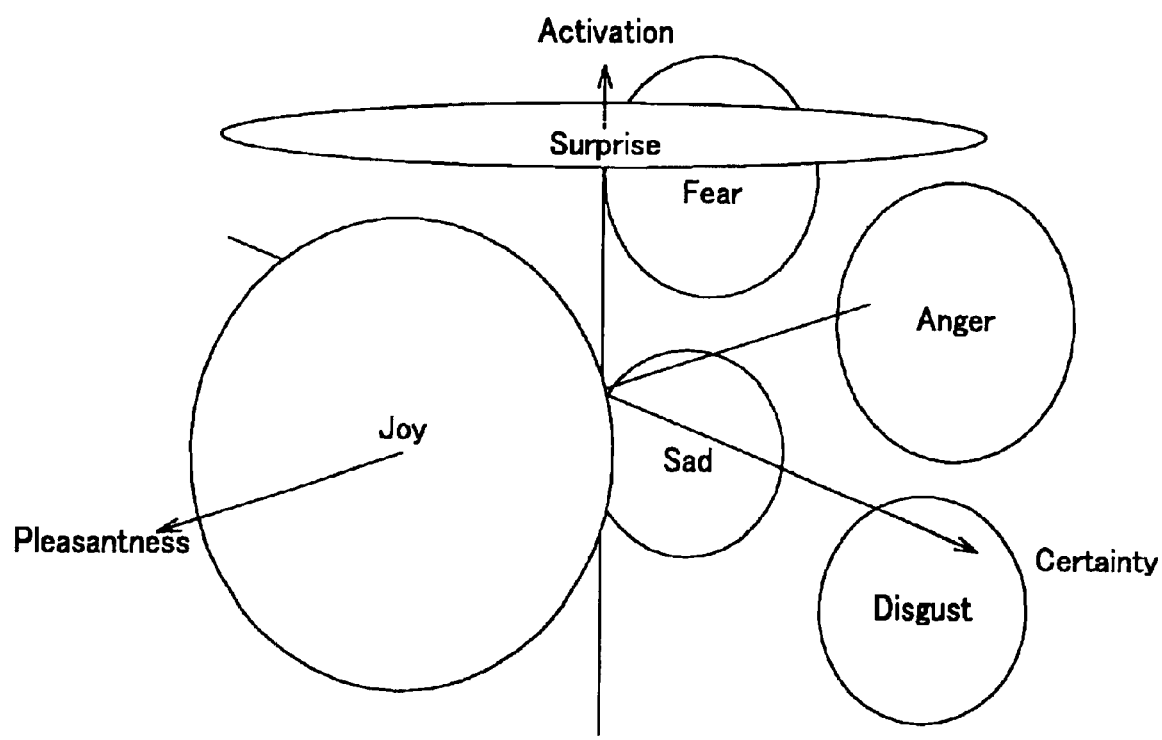
FIG. 15 illustrates a 3-dimensional topological space for expressing the emotion of the robot apparatus.

Although the status of the user or the robot apparatus 1 is represented in the above embodiment as being a point on the topological plane, this is merely illustrative, such that it may also be represented as being a point on the topological plane, shown for example in FIG. 15.

INDUSTRIAL APPLICABILITY

With the above-described method and system for controlling the man-machine interface unit, according to the present invention, the action of the robot apparatus may be set so as to lead a user from an optional current status to a desired target status by pre-collecting a data triple comprised of an initial status (feeling) prior to execution of an action, an final status after execution of the action (feeling) and the action taken place, as learning sample. In addition, by applying the method and system for controlling the man-machine interface unit to an autonomous robot apparatus, at least having a feeling model and which is able to change the action expressed responsive to the feeling, it is possible for the robot apparatus to change the action so as to lead the user's feeling status to a feeling status close to the robot apparatus' own current emotion, based on the estimated results of the user's feeling, thus improving entertainment performance of the robot apparatus.

What is claimed is:

1. A method for controlling a man-machine-interface unit, wherein
with respect to at least one user an initial status ($e_i$) before and a final status ($e_f$) after an action (a) taken place are essentially detected on said man-machine-interface, and wherein
data triples essentially representing said initial status ($e_i$), said final status ($e_f$) and said action (a) taken place are collected as learning samples (1), and wherein
said learning samples (1) are used to at least derive and initialize a target action to be carried out so as to carry in each case said user from a given current status ($e_c$) to a given desired target status ($e_t$) on said man-machine-interface.

2. A method according to claim 1 wherein in each case current and initial status data (CSD, ISD) are received and generated essentially corresponding to and representing said current status ($e_c$) and the initial status ($e_i$) of said user, respectively.

3. A method according to claim 1 wherein in each case final and target status data (FSD, TSD) are received and generated essentially corresponding to and representing said final status (ef) and said target status (et) of said user, respectively.

4. A method according to claim 1 wherein action data (AD) and target action data (TAD) are received and generated essentially corresponding to and representing said action (a) taken place and said target action (t) derived.

5. A method according to claim 1 wherein said current, initial, final and target statuses (ec, ei, ef, et) and in particular the corresponding and/or representing data (CSD, ISD, FSD, TSD) thereof are in each case represented by and modeled in an embedding topological manifold (EM, DM), in particular of two dimensions.

6. A method according to claim 5 wherein separate manifolds are derived and/or used for distinct users and/or for classes of users and/or wherein common or global manifolds for all users are derived and/or used.

7. A method according to claim 1 wherein said action (a) taken place, said target action (t) derived said representing and corresponding data (AD, TAD) thereof are in each case represented by and modeled in an embedding topological manifold (AM, ADM).

8. A method according to claim 1 wherein emotional statuses are used said current, initial, final, target statuses (ec, ei, ef, et).

9. A method according to claim 1 wherein for each user based on the set (L) of learning samples (1) a transmotion mapping (T)

$$E \oplus A \rightarrow E$$

$$<ei, a>^\varepsilon E \oplus A \rightarrow ef: =T(ei, a)=Ta(ei) \; ^\varepsilon E$$

is derived and wherein E denotes an emotion manifold and is one of the topological manifolds (EM, EDM) for the user statuses and for the status data thereof, A denotes an action manifold and is one the topological manifolds (AM, ADM) for the action and for the action data and ei, ef and a denote respective elements of the manifolds E and A.

10. A method according to claim 1 wherein for given desired initial and target statuses (ei, et) for a given user an action (a) from a learning sample (1) with a given current status (ec), final status (ef) and an action (a) taken place already sampled is chosen as a target action (t) for which the initial and current statuses (ei, ec) and the final or the target statuses (ef, et) and the data (ISD, CSD, FSD, TSD) thereof are in a next topological neighborhood.

11. A method according to claim 10 wherein a distance measure, a metric, continuity, direction, vector properties of said statuses ($e_i, e_e, e_T, e_t$) and actions (a, t) are involved to derive and describe said neighborhood.

12. A method according to claim 1 wherein a sequence of actions (a) to be carried out is derived and initialized to be executed as said target action (t) so as to lead a given user to a target status (et) to fit best to a given desired final status (ef) for said user.

13. A method according to claim 1 wherein a modification is included into and performed on a derived target action (t) and into the data (TAD) thereof.

14. A method according to claim 13 wherein said modification is introduced randomly, by means of a probabilistic measure, on the basis of topological, distance, metric, continuity, direction, vector properties.

15. A method according to claim 1 wherein obtained learning samples (1)—in particular to derive said topological manifolds (EM, EDM, AM, ADM)—are generalized.

16. A method according to claim 15 wherein the step of generalizing said learning samples (1) at least comprises a step of averaging and weighting learning samples (1) from different users, in particular to derive common and/or global topological manifolds, wherein in particular said different users are emotionally clustered depending on their typical status/and or behavior.

17. A method according to claim 15 wherein the step of generalizing said learning samples (1) at least comprises at least a step of reducing the dimension of the action manifold (AN, ADM), in particular by means of a projection.

18. A method according to claim 5 wherein the step of generalizing said learning samples (1) comprises at least a step of enlarging and reducing the extension of neighborhood of a given learning sample (1) within which all triples of initial statuses (ei), final statuses (ef) and target actions (t) are classified as being equivalent to said given learning sample (1), in particular until the point where a final status (ef) and a target action (t) are valid for all initial statuses (ei) and until the point where the final status (ef) is irrelevant and only a direction of a change of the statuses is considered.

19. A system for controlling a man-machine-interface unit which is capable of performing and realizing the method for controlling a man-machine-interface unit according to claim 1 and the steps thereof.

20. A computer program product comprising computer program means adapted to perform and realize the method for controlling a man-machine-interface unit according to claim 1 and the steps thereof, when it is executed on a computer, a digital signal processing means.

21. A robot apparatus acting responsive to inner and outer statuses comprising:

status detection means for detecting the status of a user of the robot apparatus;

target status setting means for setting a desired target status of the user;

action determining means for determining an action to be carried out to lead the user's status detected by said status detection means to said target status; and controlling means for carrying out the determined action.

22. The robot apparatus according lo claim 21 further comprising:

learning means; wherein the action to be carried out to lead the user's status as detected by said status detection means to said target status is updated by said learning means.

23. The robot apparatus according to claim 22 wherein said learning means collects a data triple representing the initial status before and a final status after an action taken place, and the action taken place, as learning sample, in connection with said user; and wherein said action determining means decides on said action to be carried out based on said learning sample.

24. The robot apparatus according to claim 21 wherein said user's status and the target status are the status of the user's feeling.

25. The robot apparatus according to claim 24 wherein said target status setting means uses the feeling status of said robot apparatus as said target status.

26. The robot apparatus according to claim 24 further comprising:

speech recognition means and picture recognition means;

said status detection means detecting the feeling status as said user's status from the speech and a face image of said user.

27. The robot apparatus according to claim 24 wherein said feeling status may be represented as a coordinate in topological space of a multiple dimensions; and wherein the user's status and the target status are given as coordinates in said topological space.

28. The robot apparatus according to claim 24 wherein said feeling status may be represented as a coordinate in a multi-dimensional topological space; and wherein the user's status and the target status are given as coordinates obtained by projecting the coordinate in said topological space on a topological plane comprising two of said multiple dimensions.

29. A method for controlling the behavior of a robot apparatus acting autonmously responsive to inner and outer statuses, comprising:

a status detection step of detecting the status of a user of the robot apparatus;

a target status setting step of setting a desired target status of the user;

an action determining step of determining an action to be carried out to lead the user's status as detected by said status detection step to said target status; and a controlling step of carrying out the action determined.

30. The method according to claim 29 further comprising:

a learning step; wherein the action to be carried out to lead the user's status as detected by said status detection step to said target status is updated by said learning step.

31. The method according to claim 30 wherein in said learning step, a data triple representing the initial status before and a final status after an action taken place, and the action taken place, as learning sample, in connection with said user, is collected; and wherein said action determining step decides on said action to be carried out based on said learning sample.

32. The method according to claim 29 wherein the user's status and the target status are the user's feeling status.

33. The method according to claim 32 wherein, in said target status setting step, the feeling status of the robot apparatus is used as said target status.

34. The method according to claim 32 further comprising:

a speech recognition step and an image recognition step;

said status detection step detects the feeling status, as said user's status, from the speech and the face image of the user.

35. The method according to claim 32 wherein said feeling status may be represented as a coordinate in topological space of a multiple dimensions; and wherein the user's status and the target status are given as coordinates in said topological space.

36. The method according to claim 32 wherein said feeling status may be represented as a coordinate in a multi-dimensional topological space; and wherein the user's status and the target status are given as coordinates obtained by projecting the coordinate in said topological space on a topological plane comprising two of said multiple dimensions.

* * * * *